(12) United States Patent
Agarwal

(10) Patent No.: US 8,862,520 B2
(45) Date of Patent: Oct. 14, 2014

(54) METHODS, SYSTEMS AND MEDIA UTILIZING RANKING TECHNIQUES IN MACHINE LEARNING

(75) Inventor: Shivani Agarwal, Waltham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 701 days.

(21) Appl. No.: 12/968,195

(22) Filed: Dec. 14, 2010

(65) Prior Publication Data

US 2011/0145175 A1 Jun. 16, 2011

Related U.S. Application Data

(60) Provisional application No. 61/286,362, filed on Dec. 14, 2009.

(51) Int. Cl.
G06N 99/00 (2010.01)
(52) U.S. Cl.
CPC .................... G06N 99/005 (2013.01)
USPC .......................................................... 706/12
(58) Field of Classification Search
CPC .................................................. G06N 99/005
USPC .......................................................... 706/12
See application file for complete search history.

(56) References Cited

U.S. PATENT DOCUMENTS

| 7,089,241 | B1 | 8/2006 | Alspector et al. |
| 7,188,055 | B2 | 3/2007 | Agrafiotis et al. |
| 7,308,443 | B1 | 12/2007 | Lee et al. |
| 2004/0162834 | A1 | 8/2004 | Aono et al. |
| 2007/0021929 | A1 | 1/2007 | Lemmo et al. |
| 2007/0094171 | A1 | 4/2007 | Burges et al. |
| 2007/0167846 | A1 | 7/2007 | Sternickel et al. |
| 2008/0097941 | A1 | 4/2008 | Agarwal |
| 2009/0254510 | A1 | 10/2009 | Omoigui |

OTHER PUBLICATIONS

Shivani Agarwal, and Partha Niyogi, "Stability and Generalization of Bipartite Ranking Algorithms", Proceedings of the 18th Annual Conference on Learning Theory, 2005, 15 pages.*
International Search Report and Written Opinion in PCT/US10/60360, dated Apr. 1, 2011.

* cited by examiner

*Primary Examiner* — Jeffrey A Gaffin
*Assistant Examiner* — Ola Olude Afolabi
(74) *Attorney, Agent, or Firm* — McCarter & English, LLP; David R. Burns

(57) ABSTRACT

Methods, systems and media are taught utilizing ranking techniques in machine learning to learn a ranking function. Specifically, ranking algorithms are applied to learn a ranking function that advantageously minimizes ranking error as a function of targeted ranking order discrepancies between a predetermined first ranking of a training plurality of data elements and a second ranking of the training plurality of data elements by the ranking function. The ranking algorithms taught may be applied to ranking representations of chemical structures and may be particularly advantageous in the field of drug discovery, e.g., for prioritizing chemical structures for drug screenings.

44 Claims, 8 Drawing Sheets

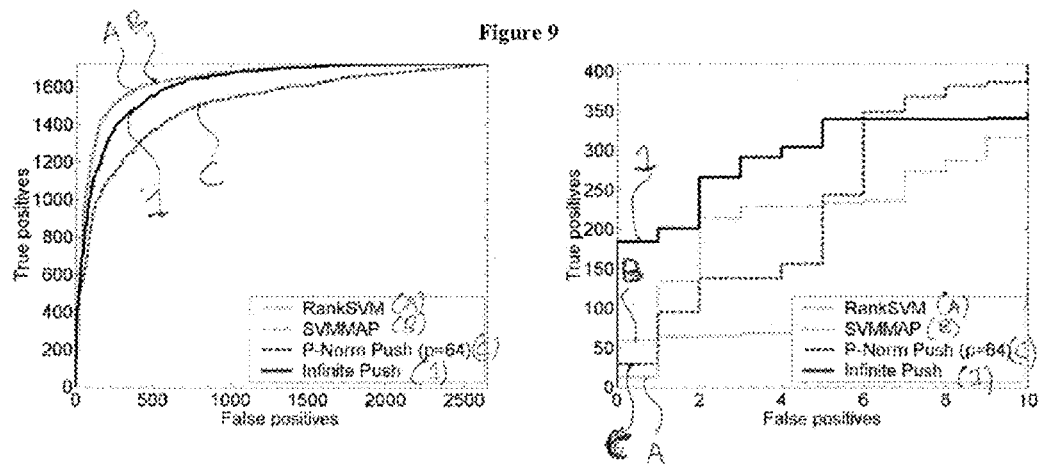
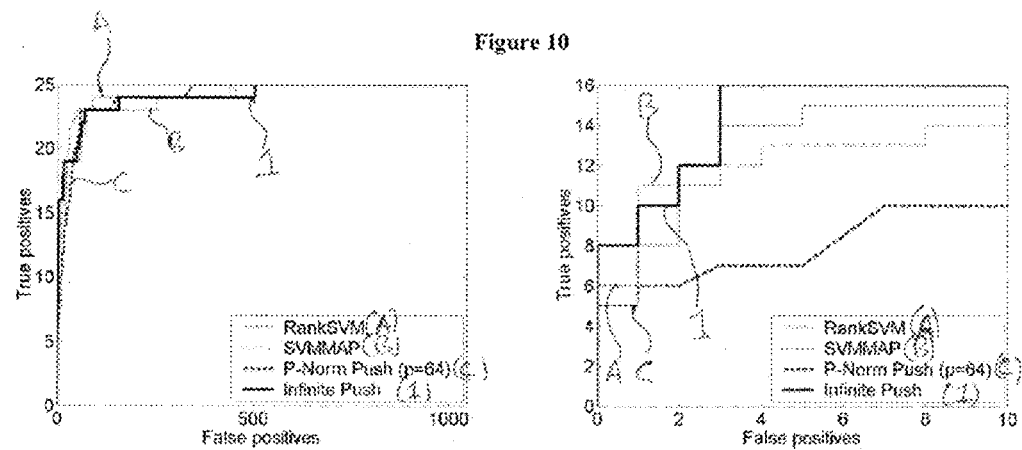

METHODS, SYSTEMS AND MEDIA UTILIZING RANKING TECHNIQUES IN MACHINE LEARNING

CROSS-REFERENCE TO RELATED APPLICATION

The present application claims the benefit of provisional patent application entitled "Methods Systems and Media Utilizing Ranking Techniques in Machine Learning For Prioritizing Representations of Chemical Structures" which was filed on Dec. 14, 2009 and assigned Ser. No. 61/286,362. The entire contents of the foregoing provisional patent application are incorporated herein by reference.

STATEMENT OF GOVERNMENT INTEREST

This invention was made with government support under Grant No. DMS0732334 awarded by the National Science Foundation. The government has certain rights in this invention.

BACKGROUND

Methods, systems and media utilizing ranking techniques in machine learning are taught herein.

Ranking problems may arise in a wide variety of information retrieval (IR) applications such as ranking data elements, for example, documents, websites, or the like, according to relevance to a query. In exemplary IR applications, it may be desirable to utilize ranking algorithms which are adapted for ranking chemical structures or representations of chemical structures. The cost of developing a new drug today is estimated to be over one billion dollars. See Shekhar, C. In silico pharmacology: Computer-aided methods could transform drug development, Chemical Biology 2008, 15, 413-414. A large part of this cost is due to failed molecules, i.e., chemical structures that appear to be promising drug candidates during initial stages of screening, but after several rounds of expensive pre-clinical and clinical testing, turn out to be unsuitable for further development. With chemical libraries today containing millions of structures for screening, there is an increasing need for computational methods that can help alleviate some of these challenges. See Shekhar, C (2008); Jorgensen, W. L. The many roles of computation in drug discovery, Science 2004, 303, 1813-1818; and Bajorath, J. Chemoinformatics: Concepts, Methods, and Tools for Drug Discovery; Humana Press, 2004. Particularly, there is a need for computational tools that can rank chemical structures, e.g., according to their chances of clinical success.

Notably, ranking problems are mathematically distinct from the classical learning problems of classification and regression, and require distinct analysis and distinct algorithms. See, e.g., Cortes, C.; Mohri, M., AUC optimization vs. error rate minimization, Advances in Neural Information Processing Systems 16, 2004.

SUMMARY

Advantageous methods, systems and media are taught herein utilizing ranking techniques in machine learning. The ranking techniques disclosed herein may be applied to and/or tailored for a wide variety of IR applications. For example, the ranking techniques may be adapted for ranking data elements in a chemical structure domain, a database domain, an Internet domain, an Intranet domain or other information domain.

The methods for learning a ranking function may generally comprise (i) determining, for example, with a computing process on a computing device, ranking error as a function of ranking order discrepancies between a predetermined first ranking of a plurality of data elements (for example, a plurality of documents or a plurality of representations of chemical structures) and a second ranking of the plurality of data elements determined by the ranking function; and (ii) solving, e.g., with the computing process on the computing device, the ranking error function for the ranking function, whereby the ranking error is minimized with respect to the second ranking of the plurality of data elements.

Methods are also disclosed herein for ranking a plurality of data elements using a learned ranking function. Methods for ranking a plurality of data elements typically comprise (i) providing a ranking function which minimizes ranking error as a function of ranking order discrepancies between a predetermined first ranking of a training plurality of data elements and a second ranking of the training plurality of the data elements determined by the ranking function, (ii) applying the ranking function to rank a test plurality of data elements, for example, in the same domain as the training plurality of data elements, and (iii) identifying from the ranking of the test plurality of data elements, a data element having a characteristic consistent with the training plurality of data elements.

System implementations and non-transitory storage medium embodiments for the forgoing methods for learning a ranking function and methods for ranking are also disclosed herein. System implementation generally comprises a computing device programmed to carry out a computing process including the steps of the forgoing methods. Similarly, non-transitory storage medium embodiments typically involve a non-transitory storage medium storing computer executable instructions for carrying out the steps of the foregoing methods.

Methods for ranking a plurality of data elements are also disclosed herein generally comprising (i) receiving a query characterizing a ranking problem for a set of data elements, (ii) processing the query to learn a ranking function, (iii) applying the ranking function to rank a test plurality of the data elements, and (iv) returning a result to the query based on the ranking of the test plurality of data elements Learning the ranking function may generally include (i) determining, e.g., with a computing process on a computing device, ranking error as a function of ranking order discrepancies between a predetermined first ranking of a training plurality of the data elements and a second ranking of the training plurality of the data elements determined by the ranking function; and (ii) solving, e.g., with the computing process on the computing device, the ranking error function for the ranking function, whereby the ranking error is minimized with respect to the second ranking of the training plurality of data elements.

System implementations for the previous methods are also disclosed generally including input means for inputting the query, a processor for processing the query by executing a computing process, storage means storing computer executable instructions for the computing process, and output means for returning the result to the query.

Methods for ranking a plurality of data elements are also disclosed generally comprising (i) providing a known ranking for a plurality of data elements in a training set, (ii) deriving a ranking function that minimizes ranking error for the ranking function with respect to the known ranking of the plurality of data elements in the training set, and (iii) ranking a plurality of data elements in a test set using the derived ranking function.

Additional features, functions and benefits of the disclosed methods, systems and media will be apparent from the description which follows, particularly when read in conjunction with the appended figures.

BRIEF DESCRIPTION OF THE DRAWINGS

FIG. 9 graphically depicts a comparison of ROC curves for evaluation of an exemplary ranking algorithm for minimizing ranking error at a top portion of the learned ranking using the Spanbase data set, according to the present disclosure.

FIG. 10 graphically depicts a comparison of ROC curves for evaluation of an exemplary ranking algorithm for minimizing ranking error at a top portion of the learned ranking using a chemoinformatic data set, according to the present disclosure.

DESCRIPTION OF EXEMPLARY EMBODIMENT(S)

Figure 1:
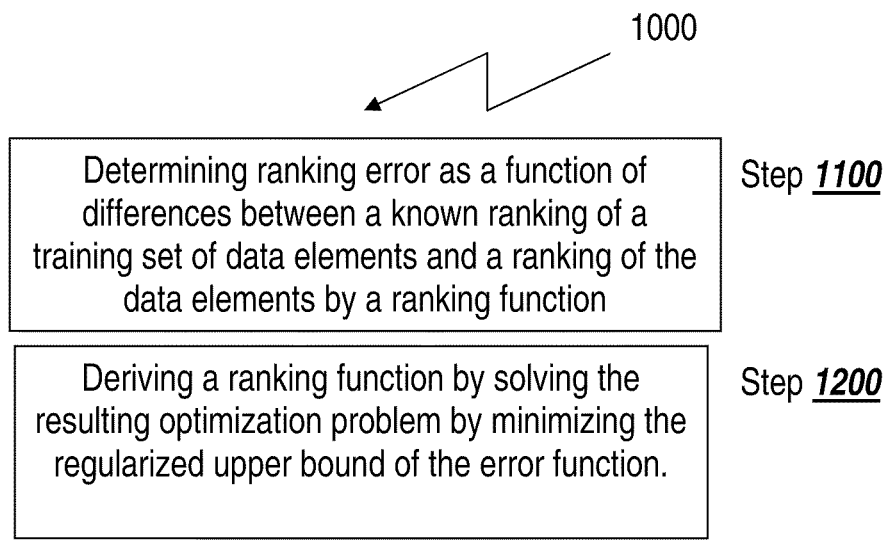
FIG. 1 depicts a block flow diagram including exemplary steps for determining a ranking function as taught herein.

Methods, systems and media are taught herein utilizing ranking techniques in machine learning to facilitate/optimize prioritization of data elements. In some exemplary embodiments, data elements may, for example, be in or from a chemical structure domain such as data representations of chemical structures. Thus, exemplary methods, systems and media are taught herein for applying ranking techniques in machine learning to the task of ranking representations of chemical structures. The exemplary ranking algorithms taught herein may be particularly advantageous in the field of drug discovery, e.g., for prioritizing chemical structures for drug screenings. The exemplary ranking algorithms taught herein are not limited to chemical structure applications, but may also be applied to any number of IR applications that include data different from data representative of chemical structures. Indeed, in some exemplary embodiments, data elements may, for example, may be documents, text files, mark up language files and other types of data.

The exemplary methods, systems and media taught herein may advantageously utilize ranking algorithms which, contrasted with conventional SVM and SVR algorithms, minimize ranking loss rather than classification/regression loss. The ranking algorithms taught herein may be derived, e.g., from either bipartite or real-value labeled sets of training data and may be used, e.g., in both virtual screening and QSAR ranking applications. The bipartite and real-value labeled sets of training data may advantageously represent a predetermined ranking for a plurality of representations of chemical structures. Thus, the ranking algorithms may advantageously determine ranking functions such that targeted ranking discrepancies are minimized relative to the predetermined ranking. The effectiveness of exemplary ranking algorithms, taught herein, was evaluated for both bipartite and real-value labeled sets of training data, e.g., relative to conventional classification based approaches (SVM) in virtual screening and conventional regression based approaches (SVR) in QSAR ranking.

In exemplary embodiments, the ranking algorithms taught herein may account for preferences, e.g., pair wise preferences (e.g., more active than/less active than relationships), preferences characterized by bipartite labels (e.g., active/inactive), or preferences characterized by real-valued labels (representing numerical activity levels). The preferences may advantageously represent objective or subjective criteria as between data elements. In exemplary embodiments, preferences may be used to supplement bipartite or real-value labeled sets of training data. Thus, for example, in the chemical structure domain, preferences may be used to distinguish, e.g., on the basis of cost, availability, potential side effects, etc., between two compounds having similar rankings (e.g., wherein the difference in activity level is below a certain threshold). Alternatively, preferences, e.g., pair-wise preferences, may be used to indicate a predetermined ranking for a plurality data elements. For example, preferences may be used to indicate a predetermined ranking of representations of chemical structure with respect to activity level. Advantageously, ranking loss may be approximated, even where only relative preferences between instances, e.g., relative activity levels of chemical structures, are known. In general, preferences present a strong tool for optimizing, fine tuning, and/or tailoring ranking loss for a particular set of circumstances. Thus, in exemplary embodiments ranking loss may account for and weight multiple preferences based on a number of difference criteria.

Real-value labeled ranking algorithms utilized by the exemplary methods, systems and non-transitory media taught herein may prove particularly advantageous. Specifically, in exemplary embodiments, the real valued ranking algorithms taught herein weight incorrectly raked pairs of data elements by the disparity in relevance between the data elements in each pair. Thus, for example, in the chemical structure domain the ranking algorithms may be designed to focus the most attention on correctly ranking instance pairs that exhibit the greatest disparity in activity levels (since errors in ranking chemical structures with similar activity levels are often less crucial than errors in ranking chemical structures with a greater differences in activity levels). The effectiveness of various exemplary real-value labeled ranking algorithms, taught herein was evaluated relative to conventional algorithms for various data sets.

In exemplary embodiments, ranking algorithms may minimize average pair-wise loss. For example, an error function may be selected to advantageously normalize aggregate pair-wise loss, e.g., aggregate relevancy weighted pair-wise loss, by the number of pairs. In other exemplary embodiments, ranking algorithms may minimize a maximum pair-wise loss, e.g., a maximum relevancy weighted pair-wise loss. For example, an error function may be selected to advantageously represent the maximum ranking margin across all pairs. The effectiveness of both exemplary ranking algorithms minimizing average pair-wise loss and exemplary ranking algorithms minimizing maximum pair wise-loss was evaluated relative to conventional algorithms for various data sets.

In practice, ranking accuracy at a top portion of a ranked list may be more important than accuracy at the bottom of the list. Thus, the ranking algorithms and methods, systems and non-transitory media taught herein may incorporate constraints that encourage accuracy in a top portion of the learned ranking, for example in a top x percentage (such as top 50%, top 25%, top 10%, top 5% or the like) of the learned ranking or top n number of results (such as top 100, top 50, top 10, or the like) in the learned ranking. In exemplary embodiments, an error function may be selected to advantageously account for the fraction of positives ranked below the highest ranking negative. Such an error function may be minimized so as to maximize the number of positives that appear before the first negative in the ranked list. In other exemplary embodiments, ranking algorithms may incorporate constraints that give greater weight to ranking data elements with higher relevancy. For example, each pair-wise loss for a given data element or aggregate pair wise loss for a given data element may be normalized relative to a characterization of relevancy for the data element such as a real-value label for the data element, or the inverse of a preferred rank position of the data element. The effectiveness of various exemplary ranking algorithms, taught herein, which encourage accuracy at the top was evaluated relative to conventional algorithms for various data sets.

In ranking representations of chemical structures, it may also be desirable to obtain as many different lead structures at a top of the ranking as possible. Thus the ranking algorithms taught herein may incorporate diversity constraints, e.g., by including a term in the error function that encourages diversity among the chemical structures in a top portion of the learned ranking. Thus, in exemplary embodiments ranking algorithms may optimize a suitable trade-off between ranking accuracy (e.g., high-activity chemical structures at the top of the list) and diversity (e.g., diverse chemical structures at the top of the list). Different diversity criteria may be used depending on the particular chemical structure collection and specific requirements of the prioritization task at hand.

In exemplary embodiments, the ranking algorithms may be kernel-based ranking algorithms. Experimental results indicate that depending on the kernel selection, such kernel-based ranking algorithms outperform both conventional SVR and SVM algorithms. Furthermore, the kernel-based ranking algorithms taught herein may be solved efficiently using gradient-based optimization methods. In particular, in exemplary embodiments, the kernel-based ranking algorithms taught herein involve solving a quadratic program (QP) resulting from the Lagrangian dual of the actual optimization problem. Standard implementations of SVM type algorithms resulting in similar QPs generally use a standard QP solver, which takes $O(n^3)$ time to solve a QP in n variables. The optimization problems taught herein, however, may involve $m^2$ variables, where m is in some embodiments the number of training chemical structures and in some embodiments the number of training documents or other data. The resulting $O(m^6)$ computation time, is prohibitive for large data sets. Thus, in exemplary embodiments, a gradient projection algorithm may be used to solve the optimization problems presented taking only $O(m^2/\epsilon^2)$ time to converge to an $\epsilon$-accurate solution, a significant improvement over a standard QP solver.

As used herein the term instance generally refers to a data element in a ranking.

Referring now to FIG. 1, a block flow diagram 1000 is presented utilizing machine learning to apply the ranking algorithms taught herein. Specifically, the block flow diagram 1000 (which in system implementations may be a computer implemented computing process executed by one or more computational devices) includes steps for learning a ranking function for ranking data elements. In some embodiments the data elements are representations of chemical structures. In some embodiments the data elements are documents. Thus, the block flow diagram 1000 generally includes a step 1100 of deriving/selecting a ranking error function for a ranking algorithm. A ranking error is determined as a function of ranking order discrepancies between a predetermined first ranking for a training set of data elements and a second ranking of the training plurality of data elements determined by the ranking function. The error function may further be tailored to meet specific needs of an application at hand. Thus, for example, in the chemical structure domain, the error function may be designed, e.g., to emphasize ranking accuracy at the top of the ranked list and/or to encourage diversity.

Once an appropriate ranking error function is determined, machine learning may be utilized in step 1200 to derive the ranking function so as to minimize the ranking error. In exemplary embodiments, the ranking function is learned from a reproducing kernel Hilbert space (RKHS). The kernel may advantageously be selected to best suit the data type being investigated (e.g., a Tanimoto kernel for binary fingerprint vectors in virtual screening and a RBF kernel for descriptor vectors in QSAR ranking). In the chemical structure domain, the ranking function may alternatively be derived using chemical similarity functions designed specifically to measure similarities between chemical structures.

Figure 2:
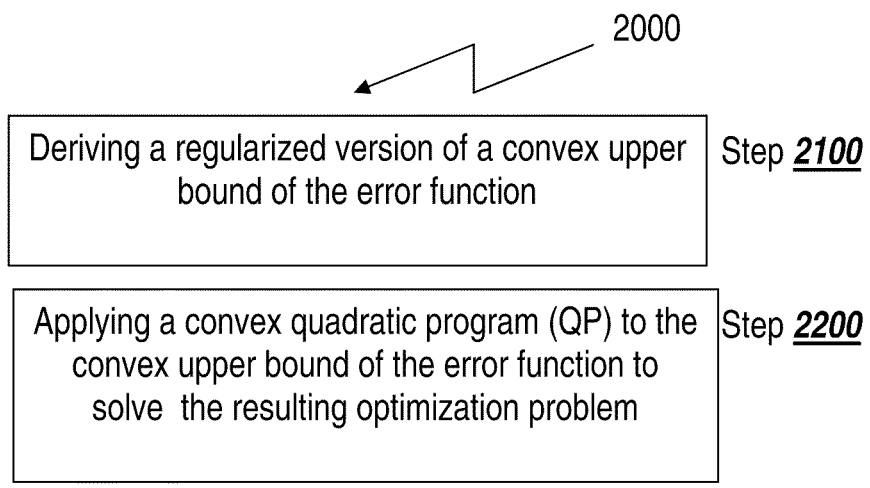
FIG. 2 depicts a block flow diagram including exemplary steps for approximately minimizing a discrete error function to derive a ranking function as taught herein.

Often, a discrete nature of the ranking error function prevents direct minimization thereof. FIG. 2, depicts an exemplary block flow diagram 2000 for deriving a ranking function in such instances, as taught herein. In step 2100, a regularized version of a convex upper bound of the error function is derived. In step 2200, a ranking function is derived by solving the optimization problem presented by the regularized version of the convex upper bound of the error function, e.g., to minimizing the regularized upper bound of the error function. For example, if the hinge ranking loss is selected as the convex upper bound the resulting optimization problem is a convex quadratic program (QP) which can be solved efficiently.

Figure 3:
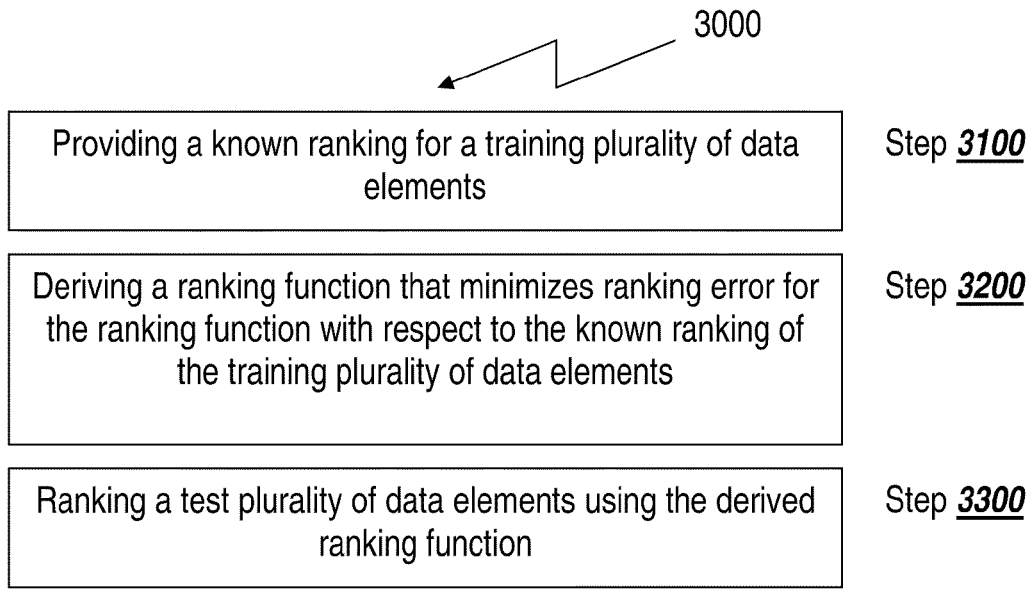
FIG. 3 depicts a block flow diagram including exemplary steps for determining and applying a ranking function based on a provided known ranking for a set of data elements as taught herein.

Referring now to FIG. 3, an exemplary block flow diagram 3000 is presented for deriving and applying a ranking function as taught herein. In step 3100, a known ranking for a training plurality of data elements, e.g., representations of chemical structures, is provided. In step 3200, a ranking function is derived that minimizes ranking error for the ranking function with respect to the known ranking of the training plurality of data elements. Finally, in step 3300, a test plurality of data elements are ranked using the derived ranking function.

Figure 4:
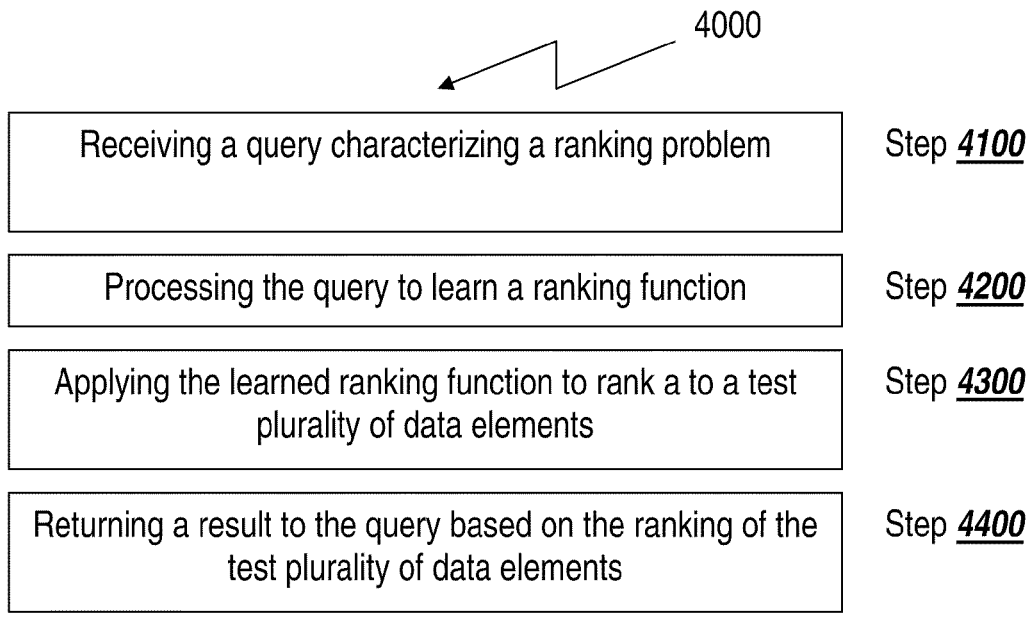
FIG. 4 depicts a block flow diagram including exemplary steps for processing a query related to a ranking problem at taught herein.

Referring now to FIG. 4, an exemplary block flow diagram 4000 is presented for processing a query related to a ranking problem as taught herein. In step 4100, a query is received characterizing a ranking problem for data. In the chemical structure domain, the query may, for example, designate a database of representations of chemical structures, a training plurality of representations of chemical structures having a predetermined/known ranking, and ranking criteria (e.g., regarding focus on diversity, accuracy at the top of the ranking, etc.). In step 4200, the query is processed to learn a ranking function. Exemplary steps for learning a ranking function are described herein, e.g., with respect to FIG. 1 and step 3200 of FIG. 2. In step 4300, the learned ranking function is applied to rank a test plurality of data elements. In some embodiments, the test plurality of data elements are representations of chemical structures. In some embodiments, the test plurality of data elements are documents. Finally, in step 4400, a result to the query is returned based on the ranking of the test plurality of data elements.

The rankings algorithms taught herein may likewise be included in system implementations e.g. involving a computer or distributed computer architecture such as a computer network or a multiple core processor. Systems may generally be utilized to input constraints, process data, and output results. System implementations are discussed in greater detail later herein.

The following sections describe in greater detail exemplary applications of the ranking techniques presented herein. A bipartite ranking setting is discussed first, followed by a real-valued label ranking setting. For both settings exemplary ranking algorithms are presented and evaluated with respect to past methodologies such as SVM and SVR. It is noted that the specific ranking error terms optimized and methods/algorithms used for optimization are exemplary embodiments and are not limiting of the scope of the methods, systems and media taught herein.

Bipartite Ranking:

Bipartite ranking problems have received significant attention over past few years. In the bipartite setting data elements are assigned to one of two categories/classes, e.g., positive or negative, active or inactive, etc. Thus, training data including examples of data elements labeled in a bipartite manner, e.g., as positive or negative may be used to derive a ranking function, e.g., such that positive data elements are ranked higher than negative ones.

An exemplary bipartite ranking problem can be described as follows. The learner is given a training sample $S=(S_+,S_-)$ including a sequence of positive examples $S_+=(x_1^+,\ldots,x_m^+)$ and a sequence of negative examples the $S_-=(x_1^-,\ldots,x_n^-)$ $x_i^+$ and $x_j^-$ being instances in some instance space X, and the goal is to learn a real-valued ranking function $f:X\to\mathbb{R}$ that ranks accurately future instances in X; in other words, that assigns higher scores to positive instances than to negative ones. The ranking quality of $f$ in this setting is often measured in terms of the bipartite ranking error. Equation 1 presents one embodiment of a bipartite ranking error function:

$$err(f;S) = \frac{1}{mn}\sum_{i=1}^{m}\sum_{j=1}^{n}\left[I_{\{f(x_i^+)<f(x_j^-)\}} + \frac{1}{2}I_{\{f(x_i^+)=f(x_j^-)\}}\right], \quad (1)$$

where $I_{\{\phi\}}$ is 1 if $-\phi$ is true and 0 otherwise; this is simply the expected fraction of data element pairs incorrectly ranked by $f$, e.g., where a negative data element is ranked higher than a positive data element by $f$. Note that the $$\frac{1}{2}I_{\{\phi\}}$$

term assumes that ties between data element pairs are broken uniformly at random.

A number of learning algorithms have been developed for minimizing bipartite ranking error on the training sample. In exemplary embodiments, Bipartite ranking error may be determined as one minus the AUC. The AUC is often used to measure the ranking quality in the binary/bipartite settings. Thus, ranking algorithms, such as those taught herein, may be viewed conceptually as, inter alia, maximizing (an approximation of) the training AUC.

An exemplary ranking algorithm for a bipartite setting is presented below. The algorithm advantageously learns a ranking function from a reproducing kernel Hilbert space (RKHS), much as SVMs and SVR do in the case of classification and regression. The discrete nature, of the bipartite ranking error function presented in Equation 1, cannot be minimized by an algorithm directly. Rather, a (bipartite) kernel-based ranking algorithm may minimize instead a regularized version of the convex depicted in FIG. 5.

Figure 5:
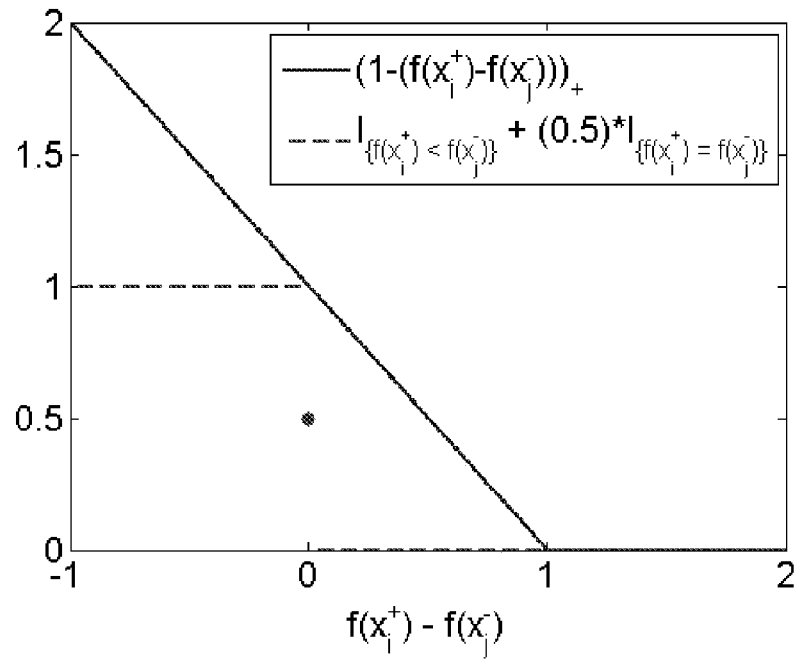
FIG. 5 graphically depicts an exemplary convex upper bound on bipartite ranking loss of a ranking function on a positive-negative instance pair as a function of quantity as taught herein.

FIG. 5 graphically depicts an exemplary convex upper bound on the bipartite ranking loss, e.g., $$I_{\{f(x_i^+)<f(x_j^-)\}} + \frac{1}{2}I_{\{f(x_i^+)=f(x_j^-)\}},$$

of a ranking function $f$ on a positive negative instance pair $(x_i^+,x_j^-)$ as a function of the quantity $(f(x_i^+)-f(x_j^-))$, wherein the upper bound on the ranking error is given by:

$$\frac{1}{mn}\sum_{i=1}^{m}\sum_{j=1}^{n}(1-(f(x_i^+)-f(x_j^-)))_+, \quad (2)$$

$$\text{where} \quad a_+ = \begin{cases} a & \text{if } a>0 \\ 0 & \text{otherwise.} \end{cases}$$

This is similar to the use of the hinge loss as a convex upper bound on the zero-one classification loss in SVMs, and is graphically depicted in FIG. 5.

In exemplary embodiments, instances in X, are described by d-dimensional vectors (such as chemical descriptor vectors as is the case for virtual screening in the chemical structure domain). Thus, $X\subseteq\mathbb{R}^d$ for some appropriate d. For the bipartite example presented above, given a training sample $S=(S_+,S_-)\in X^m\times X^n$, the (linear) kernel-based ranking algorithm learns a linear ranking function $f:X\to\mathbb{R}$, given by $f(x)=w\cdot x$, wherein the weight vector $w\in\mathbb{R}^d$ is selected as follows:

$$\min_{w\in\mathbb{R}^d}\left[\frac{1}{mn}\sum_{i=1}^{m}\sum_{j=1}^{n}(1-(w\cdot x_i^+ - w\cdot x_j^-))_+ + \frac{1}{2C}\|w\|^2\right], \quad (3)$$

where $\|w\|$ denotes the Euclidean norm of w and C>0 is an appropriate regularization parameter.

More generally, if $\mathcal{F}$ is an RKHS of real-valued functions on X, the kernel-based ranking algorithm learns a ranking function $f\in\mathcal{F}$ as follows:

$$\min_{f \in \mathcal{F}} \left[ \frac{1}{mn} \sum_{i=1}^{m} \sum_{j=1}^{n} (1 - (f(x_i^+) - f(x_j^-)))_+ + \frac{1}{2C} \|f\|_{\mathcal{F}}^2 \right], \quad (4)$$

where $\|f\|\mathcal{F}$ denotes the RKHS norm of $f$ in $\mathcal{F}$. In practice, the above optimization problem may be solved by reduction to a convex quadratic program (QP), much as is done in the case of SVMs for classification. In particular, if $K: X \times X \to \mathbb{R}$ is the kernel function associated with $\mathcal{F}$ then the above optimization problem reduces to the following QP over mn variables $\alpha_{ij} (1 \leq i \leq m, 1 \leq j \leq n)$:

$$\min_{\alpha} \left[ \frac{1}{2} \sum_{i=1}^{m} \sum_{j=1}^{n} \sum_{k=1}^{m} \sum_{l=1}^{n} \alpha_{ij} \alpha_{kl} (K(x_i^+, x_k^+) - K(x_i^+, x_l^-) - K(x_j^-, x_k^+) + K(x_j^-, x_l^-)) - \sum_{i=1}^{m} \sum_{j=1}^{n} \alpha_{ij} \right] \quad (5)$$

subject to $0 \leq \alpha_{ij} \leq \frac{C}{mn}$ for all $i, j$.

Given the solution $\alpha$ to the above QP, the solution to Equation 4 is given by:

$$f(x) = \sum_{i=1}^{m} \sum_{j=1}^{n} \alpha_{ij} (K(x_i^+, x) - K(x_j^-, x)). \quad (6)$$

Thus, given a training sample $S = (S_+, S_-) \in X^m \times X^n$ and a kernel function K corresponding to an RKHS $\mathcal{F}$ the bipartite kernel-based ranking algorithm learns a ranking function $f: X \to \mathbb{R}$ in $\mathcal{F}$ by solving the QP in Equation 5, and then constructing $f$ as in Equation 6.

In practice, ranking accuracy at the top of a ranked list may often be more important than accuracy at the bottom of the list. Indeed, in virtual screening, e.g., where the goal may be to identify active chemical structures in a large chemical library containing mostly inactive chemical structures, it is especially important that active chemical structures are returned at the top of the ranking. Taught herein is an exemplary ranking algorithm that focuses on ranking accuracy at the top in the context of bipartite ranking. Note that a similar extension is possible for ranking with real-valued labels.

As above, consider the bipartite ranking setting in which the input consists of a training sample $S = (S_+, S_-)$ including a sequence of positive examples $S_+ = (x_1^+, \ldots, x_m^+)$ and a sequence of negative examples $S_- = (x_1^-, \ldots, x_n^-)$, wherein $x_i^+$ and $x_j^-$ are instances in some instance space X and wherein the goal is to learn a real-valued ranking function $f: X \to \mathbb{R}$ that ranks accurately future instances in X. For the situation where correct ranking is particularly important at the top of the list, the ranking quality of $f$ can be measured as follows:

$$err^{new}(f; S) = \max_{1 \leq j \leq n} \left\{ \frac{1}{m} \sum_{i=1}^{m} \left[ I_{\{f(x_i^+) < f(x_j^-)\}} + \frac{1}{2} I_{\{f(x_i^+) = f(x_j^-)\}} \right] \right\} \quad (1a)$$

where $I_{\{\phi\}}$ is 1 if $\phi$ is true and 0 otherwise. Equation 1a advantageously accounts for the fraction of positives ranked below the highest ranking negative (in expectation, assuming ties are broken uniformly at random). Therefore, minimizing such corresponds to maximizing the number of positives that appear before the first negative in the ranked list. Similar to Equation 1, Equation 1a may be minimized using an appropriately regularized version of the following convex upper bound:

$$\max_{1 \leq j \leq n} \left\{ \frac{1}{m} \sum_{i=1}^{m} (1 - (f(x_i^+) - f(x_j^-)))_+ \right\} \quad (2a)$$

wherein, $$a_+ = \begin{cases} a & \text{if } a > 0 \\ 0 & \text{otherwise}. \end{cases}$$

Where $\mathcal{F}$ is an RKHS of real-valued functions on X, an algorithm may be designed to minimize a regularized version of the above quantity over $f \in \mathcal{F}$ as follows:

$$\min_{f \in \mathcal{F}} \left[ \max_{1 \leq j \leq n} \left\{ \frac{1}{m} \sum_{i=1}^{m} (1 - (f(x_i^+) - f(x_j^-)))_+ \right\} + \frac{1}{2C} \|f\|_{\mathcal{F}}^2 \right] \quad (3a)$$

wherein $\|f\|\mathcal{F}$ denotes the RKHS norm of $f$ in $\mathcal{F}$ and wherein $C > 0$ is an appropriate regularization parameter. As in the previous example, the above optimization problem may be solved by considering the dual of an equivalent optimization problem. In particular, if $K: X \times X \to \mathbb{R}$ is the kernel function associated with $\mathcal{F}$, the above optimization problem may be rewritten, with the help of slack variables and taking the Lagrangian dual, as the following problem over mn variables $\alpha_{ij} (1 \leq i \leq m, 1 \leq j \leq n)$:

$$\min_{\alpha} \left[ \frac{1}{2} \sum_{i=1}^{m} \sum_{j=1}^{n} \sum_{k=1}^{m} \sum_{l=1}^{n} \alpha_{ij} \alpha_{kl} (K(x_i^+, x_k^+) - K(x_i^+, x_l^-) - K(x_j^-, x_k^+) + K(x_j^-, x_l^-)) - \sum_{i=1}^{m} \sum_{j=1}^{n} \alpha_{ij} \right] \quad (4a)$$

subject to $$0 \leq \alpha_{ij} \leq \gamma_j \text{ for all } i, j$$

$$\sum_{j=1}^{n} \gamma_j = \frac{C}{m}.$$

In contrast with the previously presented bipartite kernel-based ranking algorithm, the above dual is not a quadratic program (QP) due to the form of the constraints. A gradient projection method may still be used solve the above dual (in this case, the projection step is more complicated, but can be performed using an $l_{1,\infty}$ projection. With this projection, the algorithm converges to an $\epsilon$-accurate solution in $O(((m+n)^2 mn \log (mn))/\epsilon^2)$ time. Given the solution $\alpha$ to the above optimization problem, the solution to Equation. (3a) is given by:

$$f(x) = \sum_{i=1}^{m} \sum_{j=1}^{n} \alpha_{ij} (K(x_i^+, x) - K(x_j^-, x)) \quad (5a)$$

Thus, given a training sample $S=(S_+,S_-) \in X^m \times X^n$ and a kernel function K corresponding to an RKHS $\mathcal{F}$ the above modified bipartite kernel-based ranking algorithm learns a ranking function $f:X \to \mathbb{R}$ in $\mathcal{F}$ by solving the optimization problem in Equation 4a, and then constructing $f$ as in Equation 5a.

Ranking with Real-Valued Labels:

In many cases, a training set of data elements may be provided where the data elements are known (or expected) to have a real-valued labels pertinent to relevance. For example, representation of chemical structures may be provided where all of the chemical structures are known (or expected) to have varying degrees of a desired characteristic structure and/or property with respect to a particular target. In such cases it is of interest to establish a fine-grained ranking among data elements in order to identify the most promising candidates. Thus, in exemplary embodiments a training set of representation of chemical structures may be provided where each chemical structure is associated, e.g., with an activity level such as an experimentally determined level of biological activity. The goal in such circumstances is to derive a ranking function whereby those chemical structures with higher degrees of a desirable characteristic structure and/or property are ranked higher.

Contrasted with binary ranking methods where data elements are associated with one of only two states (e.g., active or inactive for chemical structures), real-value based ranking associates data elements with real-valued labels (ranking with real-valued labels has been studied by Agarwal, S.; Niyogi, P., Generalization bounds for ranking algorithms via algorithmic stability, Journal of Machine Learning Research 2009, 10, 441-474). Real-value based ranking can generally be described as follows: A labeled training sample $S=((x_1, y_1), \ldots, (x_m, y_m))$, is provided, wherein $x_i$ is an instance in some instance space X and the $y_i$ is a real-valued labels denoting relevance of a corresponding $x_i$. The label training Sample may be advantageously analyzed to determine a ranking function $f:X \to \mathbb{R}$ that ranks accurately future instances in X by relevance, e.g., ranks instances with higher relevance values higher. The ranking quality of $f$ in this setting can be measured in terms of the following relevance-weighted ranking error:

$$err(f;S) = \frac{1}{|P|} \sum_{(i,j) \in P} (y_i - y_j) \left[ I_{\{f(x_i) < f(x_j)\}} + \frac{1}{2} I_{\{f(x_i) = f(x_j)\}} \right], \quad (7)$$

where $P = \{(i,j) | y_i > y_j\}$ denotes a pair of instances in S. The error contribution as between each pair of instances may be weighted by the difference in relevance between the instances, i.e., $(y_i - y_j)$. Thus, incorrectly ranked pairs of instances with a large differences in relevance values (e.g., pairs of chemical structures with large differences in activities) result in a greater error contribution than incorrectly ranked pairs of instances with smaller differences in relevance values (e.g., pairs of chemical structures with similar activities).

An exemplary kernel-based ranking algorithm for minimizing the relevance-weighted ranking error of Equation 7 is taught herein. As in the bipartite case, the ranking error in Equation 7 cannot be minimized directly. Thus, the kernel-based ranking algorithm minimizes a regularized version of the following convex upper bound on the ranking error:

$$\frac{1}{|P|} \sum_{(i,j) \in P} ((y_i - y_j) - (f(x_i) - f(x_j)))_+. \quad (8)$$

Figure 6:
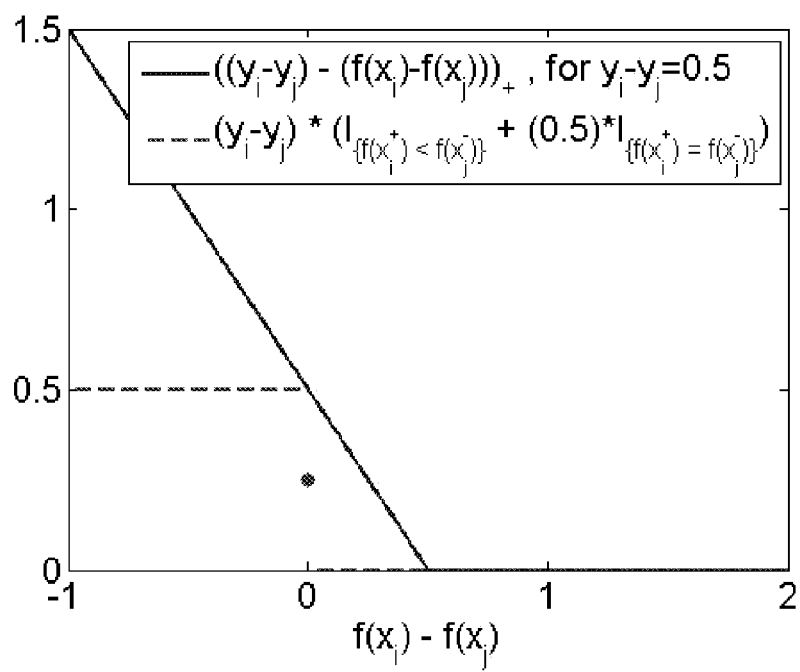
FIG. 6 graphically depicts an exemplary convex upper bound on relevance-weighted ranking loss of a ranking function on a pair of instances illustrated for a relevance difference of 0.5 and as a function of quantity as taught herein.

FIG. 6 depicts a convex upper bound on the relevance weighted loss $$(y_i - y_j) \left[ I_{\{f(x_i^+) < f(x_j^-)\}} + \frac{1}{2} I_{\{f(x_i^+) = f(x_j^-)\}} \right]$$

of a ranking function $f$ on a pair of examples $(x_i, y_i), (x_j, y_j)$ with $y_i > y_j$, illustrated for $(y_i - y_j) = 0.5$, as a function of the quantity $(f(x_i) - f(x_j))$.

Given a training sample $S \in (X \times \mathbb{R})^m$ and an RKHS $\mathcal{F}$ of real-valued functions on X, the kernel-based ranking algorithm taught herein advantageously selects a ranking function $f \in \mathcal{F}$ as follows:

$$\min_{f \in \mathcal{F}} \left[ \frac{1}{|P|} \sum_{(i,j) \in P} ((y_i - y_j) - (f(x_i) - f(x_j)))_+ + \frac{1}{2C} \|f\|_{\mathcal{F}}^2 \right]. \quad (9)$$

It can be shown that if $K:X \times X \to \mathbb{R}$ is the kernel function associated with $\mathcal{F}$, then the above optimization problem reduces to the following convex QP in |P| variables $\alpha_{ij}(i,j) \in P$):

$$\min_\alpha \left[ \frac{1}{2} \sum_{(i,j) \in P} \sum_{(k,l) \in P} \alpha_{ij} \alpha_{kl} (K(x_i, x_k) - K(x_i, x_l) - K(x_j, x_k) + K(x_j, x_l)) - \sum_{(i,j) \in P} \alpha_{ij} (y_i - y_j) \right] \quad (10)$$

subject to $$0 \le \alpha_{ij} \le \frac{C}{|P|} \text{ for all } (i, j).$$

Given the solution $\alpha$ to the above QP, the solution to Equation 9 is given by:

$$f(x) = \sum_{(i,j) \in P} \alpha_{ij} (K(x_i, x) - K(x_j, x)). \quad (11)$$

Thus, given a training sample $S \in (X \times \mathbb{R})^m$ and a kernel function K corresponding to an RKHS $\mathcal{F}$, the kernel-based ranking algorithm for the real-valued labels setting learns a ranking function $f:X \to \mathbb{R}$ in $\mathcal{F}$ A by solving the QP in Equation 10, and then constructing $f$ as in Equation 11.

Virtual Screening Experiments in the Chemical Structure Domain:

In virtual screening experiments conducted, the data sets included five sets of representations of chemical structures that each target a different protein, and a background set of chemical structures assumed to be inactive. The five active sets contained representations of fifty chemical structures each in the following classes: reversible inhibitors of cyclin-dependent kinase 2 (CDK2), cyclooxygenase-2 (COX2), factor Xa (FXa), phosphodiesterase-5 (PDE5), and reversible antagonists of the $\alpha_{1A}$ adrenoceptor ($\alpha_{1A}$AR). The "inactive" set contained representations of 1,892 chemical structures drawn from the National Cancer Institute (NCI) diversity set. Thus, for each of the five targets, a total of fifty active chemical structures were represented and 2092 inactives (including the 1,892 background chemical structures and the 200 chemical structures belonging to the other four active sets) were represented. Additional details on the data sets may be found in Jorissen, R. N.; Gilson, M. K., Virtual screening of molecular databases using a support vector machine, Journal of Chemical Information and Modeling 2005, 45, 549-561.

Given the prevalence of binary molecular fingerprints as chemical descriptors in virtual screening (see, e.g., Wassermann, A. M.; Geppert, H.; Bajorath, J., Searching for target-selective chemical structures using different combinations of multi-class support vector machine ranking methods, kernel functions, and fingerprint descriptors, Journal of Chemical Information and Modeling 2009, 49, 582-592; Wilton, D.; Willett, P., Comparison of ranking methods for virtual screening in lead-discovery programs, Journal of Chemical Information and Computer Sciences 2003, 43, 469-474; and Geppert, H.; Humrich, J.; Stumpfe, D.; Gartner, T.; Bajorath, J., Ligand prediction from protein sequence and small molecule information using support vector machines and fingerprint descriptors, Journal of Chemical Information and Modeling 2009, 49, 767-779) each chemical structure in the above data sets was represented using Molprint2D fingerprints (see, e.g., Bender, A.; Mussa, H. Y; Glen, R. C.; Reiling, S., Molecular similarity searching using atom environments, information-based feature selection, and a naive Bayesian classifier, Journal of Chemical Information and Computer Sciences 2004, 44, 170-178), which can be computed using publicly available software (e.g., MOLPRINT 2D, http://www.molprint.com) and have been shown recently to give superior performance compared to other types of fingerprints in SVM-based ranking applications. A Molprint2D fingerprint associated with a chemical structure includes of a set of strings describing the atom environments present in the chemical structure. These strings were converted to bit vectors by enumerating all the atom environment strings present in the data sets and assigning a unique fingerprint position to each such string. For each chemical structure, the bit corresponding to a given string was set to 1 if the associated atom environment was present in the chemical structure, and 0 otherwise. For the experiments conducted the result was a fingerprint representation with a total of 17,221 bit positions.

Three different ways were considered to split representations of the active chemical structures into training and test sets. In particular, representations of the fifty active chemical structures for each target were listed in a manner such that chemical structures with similar chemistries were grouped together. The chemical structures were then split in two ways. In the first split, representations of the top twenty-five chemical structures in each list were separated from the bottom twenty-five, with one half going to the training set and the other half going to the test set; in this case, representations of the active chemical structures in the training and test sets were mostly quite different. In the second split, representations of the odd-numbered chemical structures in each list were separated from representations of the even-numbered chemical structures, again with one half going to the training set and the other half going to the test set; in this case, the active chemical structures associated with the training and test sets were highly similar. In each case, the representations of background chemical structures were partitioned in a fixed manner (odd-numbered entries in a fixed ordering were separated from even-numbered entries), with representations of half the chemical structures going to the training set and representations of half going to the test set. The above two splits are both extremes, representing the worst-case and best-case possibilities, respectively. In practice, the training set is likely to be more representative of the test set than in the first (worst-case) split above, and less representative than in the second (best-case) split. To simulate this, a third split was considered, in which the active and background sets were each partitioned randomly, with one half going to the training set and the other half going to the test set.

In addition, to evaluating the impact of the training set size, experiments in which 20%, 40%, 60%, 80% and 100% of the training chemical structures were used. This process was repeated with ten random partitions of the representations of chemical structures into training and test sets.

As discussed above the performance of the exemplary bipartite kernel-based ranking algorithm was compared with that of a conventional SVM-based ranking method on the above data sets. Thus the following performance measures were considered:

1. Bipartite ranking error: as (approximately) optimized by the bipartite kernel-based ranking algorithm. Specifically, given a ranking function $f: X \to \mathbb{R}$ and a test sample $T=(T_+, T_-)$ including m positive instances $T_+=(x_1^+, \ldots, x_m^+) \in X^m$ and n negative instances $T_-=(x_1^-, \ldots, x_n^-) \in X^n$ the bipartite ranking error of $f$ with respect to T measures the fraction of positive-negative pairs in T mis-ranked by $f$, and is given by:

$$err(f; T) = \frac{1}{mn}\sum_{i=1}^{m}\sum_{j=1}^{n}\left[I_{\{f(x_i^+)<f(x_j^-)\}} + \frac{1}{2}I_{\{f(x_i^+)=f(x_j^-)\}}\right].$$

2. Area under the ROC curve (AUC): simply one minus the bipartite ranking error; this measure was included since it has the intuitive interpretation of being the fraction of positive-negative pairs in T that are ranked correctly by $f$, and is widely used as a ranking performance measure in the binary setting (for more information about the AUC see Hanley, J. A.; McNeil, B. J., The meaning and use of the area under a receiver operating characteristic (ROC) curve, Radiology 1982, 143, 29-36).

3. Average precision: the precision at a given position r is widely used in information retrieval to measure the concentration of relevant results in the top r results in a ranked list. Applied to the virtual screening experiments disclosed herein, the precision of $f$ at position r in T for $1 \le r \le m+n$ is defined as the proportion of actives in the top r chemical structures returned by $f$:

$$prec_r(f; T) = \frac{1}{r}\sum_{i=1}^{r}I_{\{y_{\pi^{-1}(i)}=+1\}},$$

where $y_{\pi^{-1}(i)}$ is the label (+1 for active and −1 for inactive) of the ith ranking instance returned by $f$. In particular, if $T'=((x_1,y_1), \ldots, (x_{m+n},y_{m+n}))$ is constructed from T according to $$(x_k, y_k) = \begin{cases} (x_k^+, +1) & \text{for } k = 1, \ldots, m \\ (x_{k-m}^-, -1) & \text{for } k = m+1, \ldots, m+n, \end{cases}$$

then $\pi(k)$ to denote the position of $x_k$ in the ranking returned by $f$, and $\pi^{-1}(i)$ to denote the index in T' of the ith ranking instance returned by $f$. Precision is closely related to the enrichment factor (EF) used for example by Jorissen et al.

(2005) to evaluate rankings in virtual screening. In particular, the enrichment factor at a given position r measures the proportion of actives in the top r chemical structures relative to the overall proportion of actives in the complete sample:

$$AP(f; T) = \frac{1}{m} \sum_{r=1}^{m+n} \left[ prec_r(f; T) \times I_{\{y_{\pi^{-1}(i)}=+1\}} \right].$$

Unlike bipartite ranking error and AUC, which measure global ranking quality of a ranked list, the average precision emphasizes ranking quality at the top of a ranked list. We note that if the ranking function f assigns distinct scores to all the chemical structures in T, then the average precision can also be written as:

$$AP(f; T) = \frac{1}{m} \sum_{i=1}^{m} \left[ \frac{\sum_{j=1}^{m} I_{\{f(x_j) \geq f(x_i)\}}}{\sum_{k=1}^{m+n} I_{\{f(x_k) \geq f(x_i)\}}} \right].$$

See also, the modified enrichment factor taught by Jorissen et al. (2005) which when evaluated over the complete sample is inversely proportional to the average rank (AR) of the actives:

$$EF'(f; T) = \frac{m+n}{2AR(f; T)} = \frac{m+n}{\frac{2}{m} \sum_{i=1}^{m} \left[ \sum_{k=1}^{m+n} I_{\{f(x_k) \geq f(x_i)\}} \right]}.$$

4. Number of actives in the top twenty-five: A simple measure of the quality of a ranking at a cutoff r is the number of actives returned in the top r chemical structures:

$$act_r(f; T) = \sum_{i=1}^{r} I_{\{y_{\pi^{-1}(i)}=+1\}}.$$

The number of actives in the top twenty-five chemical structures, $act_{25}(f; T)$ is reported herein. Note that the precision at r is simply:

$$prec_r(f; T) = \frac{act_r(f; T)}{r}.$$

Together with precision, another measure frequently reported when evaluating a ranking at a cutoff r is the recall, which is the proportion of all actives in the sample that are returned in the top r chemical structures:

$$recall_r(f; T) = \frac{act_r(f; T)}{m}.$$

In the present data sets, the total number of actives in each test sample is m=twenty five. In an ideal ranking in our case, all twenty-five active chemical structures would be placed above all the inactive chemical structures, which would give $act_{25}(f; T)=25$.

5. Number of active in the top one-hundred: the number of actives in the top one-hundred chemical structures, $act_{100}(f; T)$. Since the total number of actives in each test sample in is m=25 (see above):

$$act_{25}(f;T) \leq act_{100}(f;T) \leq 25.$$

As discussed above the performance of an exemplary bipartite kernel-based ranking algorithm was compared with that of SVM-based ranking on five data sets including actives with respect to CDK2, COX2, FXa, PDE5, and $\alpha_{1A}$AR, and a background set of inactives. Each representation of a chemical structure in these data sets was represented using a binary molecular fingerprint vector with 17; 221 bit positions; thus the instance space in this case was $X=\{0,1\}^d$ for d=17; 221.

Experiments were conducted for two types of kernels: the linear kernel given by:

$$K_{linear}(x, x') = x \cdot x',$$

and the Tanimoto kernel that is often used with binary fingerprint vectors:

$$K_{Tanimoto}(x, x') = \frac{x \cdot x'}{x \cdot x + x' \cdot x' - x \cdot x'}.$$

For the SVM algorithm, Joachim's SVMlight software was used (SVMlight, http://svmlight.joachims.org.; see also Joachims, T., Making large-scale SVM learning practical, In Advances in kernel Methods—Support Vector Learning; MIT Press, 1999; Chapter 11, pp 169-184). The regularization parameter C in each training run was selected by 5-fold cross-validation from the range {0.1, 1, 10, 100, 1000}; in each case, the value of C that gave the lowest average bipartite ranking error (equivalently, the highest average AUC) across the five folds was used in training. An exemplary bipartite kernel-based ranking algorithm was also run through SVMlight (using the '–z p' software option; see SVMlight, http://svmlight.joachims.org). The regularization parameter C was selected as above.

As described above, three different splits of the data sets into training and test sets were considered. The results on the 1st/2nd splits are shown in Table 1, for the linear kernel, and in Table 2 for the Tanimoto kernel. In each case, the better performance is shown in boldface. While not much can be said about the superiority of one algorithm over the other from these results, one observation is that in the case of kernel-based ranking algorithms, the use of the Tanimoto kernel almost consistently improves performance over the linear kernel when measured in terms of the bipartite ranking error or AUC. SVM based ranking did not exhibit similar improvement.

TABLE 1

Virtual screening results on 1st/2nd splits with the linear kernel.

| Data set | Train/test split | Ranking error SVM | Ranking error Rank SVM | AUC SVM | AUC Rank SVM | Average precision SVM | Average precision Rank SVM | Actives in top 25 SVM | Actives in top 25 Rank SVM | Actives in top 100 SVM | Actives in top 100 Rank SVM |
|---|---|---|---|---|---|---|---|---|---|---|---|
| CDK2 | 1st/2nd | 0.3141 | 0.2723 | 0.6859 | 0.7277 | 0.3414 | 0.1885 | 8 | 7 | 11 | 10 |
|  | 2nd/1st | 0.3209 | 0.3495 | 0.6791 | 0.6505 | 0.3623 | 0.3233 | 9 | 7 | 12 | 11 |
| COX2 | 1st/2nd | 0.1545 | 0.1455 | 0.8455 | 0.8545 | 0.7405 | 0.7397 | 18 | 18 | 19 | 19 |
|  | 2nd/1st | 0.2463 | 0.2462 | 0.7537 | 0.7538 | 0.3161 | 0.3162 | 6 | 6 | 13 | 13 |
| FXa | 1st/2nd | 0.0019 | 0.0060 | 0.9981 | 0.9940 | 0.9495 | 0.9090 | 22 | 22 | 25 | 25 |
|  | 2nd/1st | 0.1188 | 0.1159 | 0.8812 | 0.8841 | 0.7194 | 0.7206 | 18 | 18 | 18 | 18 |
| PDE5 | 1st/2nd | 0.2067 | 0.1994 | 0.7933 | 0.8006 | 0.0996 | 0.1002 | 3 | 3 | 14 | 13 |
|  | 2nd/1st | 0.1591 | 0.1595 | 0.8409 | 0.8405 | 0.1139 | 0.1140 | 2 | 2 | 11 | 11 |
| $\alpha_{1A}$AR | 1st/2nd | 0.0743 | 0.0546 | 0.9257 | 0.9454 | 0.6927 | 0.7259 | 15 | 16 | 19 | 21 |
|  | 2nd/1st | 0.0302 | 0.0263 | 0.9698 | 0.9737 | 0.6527 | 0.7193 | 14 | 17 | 20 | 22 |

TABLE 2

Virtual screening results on 1st/2nd splits with the Tanimoto kernel.

| Data set | Train/test split | Ranking error SVM | Ranking error Rank SVM | AUC SVM | AUC Rank SVM | Average precision SVM | Average precision Rank SVM | Actives in top 25 SVM | Actives in top 25 Rank SVM | Actives in top 100 SVM | Actives in top 100 Rank SVM |
|---|---|---|---|---|---|---|---|---|---|---|---|
| CDK2 | 1st/2nd | 0.2616 | 0.2315 | 0.7384 | 0.7685 | 0.2841 | 0.1572 | 8 | 6 | 13 | 13 |
|  | 2nd/1st | 0.2734 | 0.2807 | 0.7266 | 0.7193 | 0.3428 | 0.3356 | 7 | 7 | 13 | 12 |
| COX2 | 1st/2nd | 0.1688 | 0.1574 | 0.8312 | 0.8426 | 0.6914 | 0.7265 | 18 | 18 | 19 | 19 |
|  | 2nd/1st | 0.2672 | 0.2279 | 0.7328 | 0.7721 | 0.2891 | 0.3299 | 6 | 6 | 12 | 15 |
| FXa | 1st/2nd | 0.0026 | 0.0031 | 0.9974 | 0.9969 | 0.9305 | 0.9162 | 22 | 22 | 25 | 25 |
|  | 2nd/1st | 0.1101 | 0.0610 | 0.8899 | 0.9390 | 0.6927 | 0.6938 | 17 | 18 | 18 | 19 |
| PDE5 | 1st/2nd | 0.1467 | 0.1666 | 0.8533 | 0.8334 | 0.1226 | 0.1050 | 4 | 3 | 15 | 14 |
|  | 2nd/1st | 0.2180 | 0.1241 | 0.7820 | 0.8759 | 0.0935 | 0.1104 | 1 | 2 | 12 | 9 |
| $\alpha_{1A}$AR | 1st/2nd | 0.0810 | 0.0519 | 0.9190 | 0.9481 | 0.6875 | 0.7091 | 16 | 16 | 20 | 21 |
|  | 2nd/1st | 0.0291 | 0.0268 | 0.9709 | 0.9732 | 0.6271 | 0.6801 | 14 | 15 | 20 | 22 |

Tables 3 and 4 show the results on the Odd/Even splits, using the linear kernel and the Tanimoto kernel, respectively. As taught herein the use of the Tanimoto kernel leads to near consistent improvement in kernel-based ranking algorithm performance over the linear kernel in terms of the bipartite ranking error or AUC. A second observation is the drastic improvement in performance on the Odd/Even splits (Tables 3-4) as compared to the 1st/2nd splits (Tables 1-2), regardless of the particular algorithm/kernel used. This is consistent with the 1st/2nd splits representing a worst-case scenario and the Odd/Even splits representing a best-case scenario.

TABLE 3

Virtual screening results on Odd/Even splits with the linear kernel.

| Data set | Train/test split | Ranking error SVM | Ranking error Rank SVM | AUC SVM | AUC Rank SVM | Average precision SVM | Average precision Rank SVM | Actives in top 25 SVM | Actives in top 25 Rank SVM | Actives in top 100 SVM | Actives in top 100 Rank SVM |
|---|---|---|---|---|---|---|---|---|---|---|---|
| CDK2 | Odd/Even | 0.0353 | 0.0298 | 0.9647 | 0.9702 | 0.8945 | 0.8302 | 21 | 19 | 23 | 22 |
|  | Even/Odd | 0.0119 | 0.0307 | 0.9881 | 0.9693 | 0.9089 | 0.8799 | 22 | 20 | 23 | 24 |
| COX2 | Odd/Even | 0.0068 | 0.0026 | 0.9932 | 0.9974 | 0.9285 | 0.9511 | 22 | 22 | 24 | 25 |
|  | Even/Odd | 0.0299 | 0.0073 | 0.9701 | 0.9927 | 0.8803 | 0.9111 | 21 | 22 | 24 | 24 |
| FXa | Odd/Even | 0.0007 | 0.0052 | 0.9993 | 0.9948 | 0.9731 | 0.9073 | 22 | 21 | 25 | 25 |
|  | Even/Odd | 0.0005 | 0.0004 | 0.9995 | 0.9996 | 0.9802 | 0.9860 | 23 | 23 | 25 | 25 |
| PDE5 | Odd/Even | 0.0005 | 0.0039 | 0.9995 | 0.9961 | 0.9856 | 0.9531 | 24 | 23 | 25 | 24 |
|  | Even/Odd | 0.0026 | 0.0047 | 0.9974 | 0.9953 | 0.9498 | 0.9367 | 23 | 22 | 25 | 24 |
| $\alpha_{1A}$AR | Odd/Even | 0.0143 | 0.0151 | 0.9857 | 0.9849 | 0.9201 | 0.9135 | 22 | 22 | 24 | 24 |
|  | Even/Odd | 0.0023 | 0.0025 | 0.9977 | 0.9975 | 0.9353 | 0.9276 | 22 | 22 | 25 | 25 |

TABLE 4

Virtual screening results on Odd/Even splits with the Tanimoto kernel.

| Data set | Train/test split | Ranking error SVM | Ranking error Rank SVM | AUC SVM | AUC Rank SVM | Average precision SVM | Average precision Rank SVM | Actives in top 25 SVM | Actives in top 25 Rank SVM | Actives in top 100 SVM | Actives in top 100 Rank SVM |
|---|---|---|---|---|---|---|---|---|---|---|---|
| CDK2 | Odd/Even | 0.0217 | 0.0180 | 0.9783 | 0.9820 | 0.8936 | 0.9113 | 21 | 20 | 24 | 24 |
|  | Even/Odd | 0.0084 | 0.0261 | 0.9916 | 0.9739 | 0.9243 | 0.8775 | 22 | 20 | 24 | 24 |
| COX2 | Odd/Even | 0.0030 | 0.0021 | 0.9970 | 0.9979 | 0.9430 | 0.9575 | 22 | 22 | 25 | 25 |
|  | Even/Odd | 0.0044 | 0.0276 | 0.9956 | 0.9724 | 0.8922 | 0.8219 | 22 | 20 | 25 | 23 |
| FXa | Odd/Even | 0.0010 | 0.0049 | 0.9990 | 0.9951 | 0.9623 | 0.8985 | 22 | 21 | 25 | 25 |
|  | Even/Odd | 0.0008 | 0.0003 | 0.9992 | 0.9997 | 0.9683 | 0.9862 | 23 | 23 | 25 | 25 |
| PDE5 | Odd/Even | 0.0021 | 0.0016 | 0.9979 | 0.9984 | 0.9709 | 0.9736 | 24 | 24 | 25 | 25 |
|  | Even/Odd | 0.0025 | 0.0019 | 0.9975 | 0.9981 | 0.9503 | 0.9576 | 23 | 23 | 25 | 25 |
| $\alpha_{1A}$AR | Odd/Even | 0.0072 | 0.0082 | 0.9928 | 0.9918 | 0.8916 | 0.9079 | 20 | 21 | 24 | 24 |
|  | Even/Odd | 0.0063 | 0.0035 | 0.9937 | 0.9965 | 0.8932 | 0.9206 | 20 | 21 | 24 | 25 |

As previously discussed, the third group of train/test splits (in which the data sets were randomly partitioned into training and test sets) was designed to simulate a situation in which the training set would be more representative of a real world situation (as opposed to best and worst case scenarios). Results for the random splits, using linear and Tanimoto kernels, are shown in Tables 5 and 6, respectively. Each number shown in these tables is the average over ten different random splits. In addition, experiments were conducted in which increasing fractions of the training set were used to train the algorithms.

Figure 7:
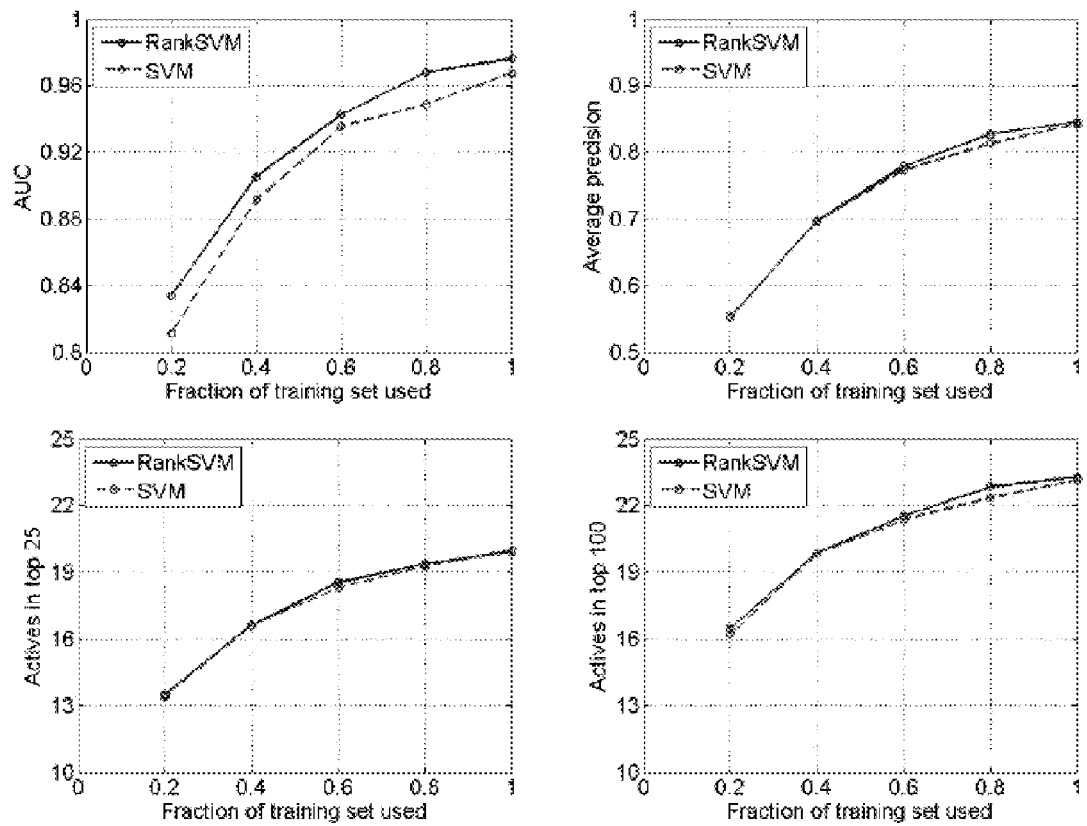
FIG. 7 graphically depicts exemplary virtual screening results on random splits with a Tanimoto kernel, averaged over five data sets for bipartite training data as taught herein.

There are several observations made: First, as in the other two splits above, the Tanimoto kernel near consistently showed improved performance compared to the linear kernel in the case of the kernel-based ranking algorithm, when measured in terms of the bipartite ranking error or AUC. Second, the performance on the test set improves with an increase in the training set size; this was true for all five data sets and regardless of the algorithm/kernel used. Third, when the complete training set including representations of twenty-five actives and representations of 1046 inactives was used (same training set size as in the 1st/2nd and Odd/Even splits above), the performance in the case of these random splits lies between the best-case and worst-case performance levels observed with respect to the 1st/2nd and Odd/Even splits. Finally, for random train/test splits using the Tanimoto kernel, the ranking performance of the exemplary kernel-based ranking algorithm, as taught herein, in terms of the bipartite ranking error and AUC is in generally superior to conventional SVM-based ranking. This is also illustrated in FIG. 7, which depicts the performance of each algorithm (using the Tanimoto kernel) averaged over the five data sets. This figure also shows that when measured in terms of the other performance measures such as average precision or number of actives retrieved in the top portion of the ranking, the performance of the two algorithms is similar. Indeed the exemplary kernel-based ranking algorithms considered with respect to the virtual screening experiments reported herein optimize (approximately) the bipartite ranking error or AUC, which are global measures of ranking performance, whereas the other three measures focus on local ranking accuracy at the top of a ranking.

TABLE 5

Virtual screening results on random splits with the linear kernel.

| Data set | No. train (act-inact) | Ranking error SVM | Ranking error Rank SVM | AUC SVM | AUC Rank SVM | Average precision SVM | Average precision Rank SVM | Actives in top 25 SVM | Actives in top 25 Rank SVM | Actives in top 100 SVM | Actives in top 100 Rank SVM |
|---|---|---|---|---|---|---|---|---|---|---|---|
| CDK2 | 5-209 | 0.2859 | 0.2813 | 0.7141 | 0.7187 | 0.3606 | 0.3436 | 8.5 | 8.2 | 12.5 | 12.1 |
|  | 10-418 | 0.1976 | 0.1834 | 0.8024 | 0.8166 | 0.5572 | 0.5238 | 13.7 | 13.1 | 16.8 | 16.3 |
|  | 15-627 | 0.1521 | 0.1381 | 0.8479 | 0.8619 | 0.6512 | 0.6489 | 16.0 | 16.3 | 18.3 | 18.4 |
|  | 20-836 | 0.0779 | 0.0787 | 0.9221 | 0.9213 | 0.7657 | 0.7206 | 18.9 | 17.3 | 21.1 | 21.0 |
|  | 25-1046 | 0.0626 | 0.0632 | 0.9374 | 0.9368 | 0.7998 | 0.7612 | 20.0 | 18.3 | 22.0 | 21.8 |
| COX2 | 5-209 | 0.1950 | 0.1966 | 0.8050 | 0.8034 | 0.6235 | 0.6230 | 14.9 | 15.0 | 17.1 | 16.9 |
|  | 10-418 | 0.1189 | 0.1200 | 0.8811 | 0.8800 | 0.7292 | 0.7334 | 17.7 | 17.4 | 19.5 | 19.9 |
|  | 15-627 | 0.0759 | 0.0684 | 0.9241 | 0.9316 | 0.8021 | 0.7982 | 19.1 | 18.9 | 20.9 | 21.1 |
|  | 20-836 | 0.0463 | 0.0379 | 0.9537 | 0.9621 | 0.8352 | 0.8417 | 19.7 | 19.9 | 22.3 | 22.7 |
|  | 25-1046 | 0.0248 | 0.0170 | 0.9752 | 0.9830 | 0.8737 | 0.8870 | 20.7 | 20.9 | 23.4 | 23.6 |
| FXa | 5-209 | 0.0680 | 0.0664 | 0.9320 | 0.9336 | 0.7847 | 0.7893 | 19.2 | 19.8 | 21.4 | 21.0 |
|  | 10-418 | 0.0515 | 0.0437 | 0.9485 | 0.9563 | 0.8621 | 0.8551 | 20.5 | 20.5 | 22.5 | 22.5 |
|  | 15-627 | 0.0242 | 0.0293 | 0.9758 | 0.9707 | 0.8879 | 0.8783 | 20.8 | 20.8 | 23.3 | 23.2 |
|  | 20-836 | 0.0282 | 0.0261 | 0.9718 | 0.9739 | 0.8915 | 0.8877 | 21.1 | 20.9 | 23.4 | 23.3 |
|  | 25-1046 | 0.0221 | 0.0195 | 0.9779 | 0.9805 | 0.9012 | 0.8943 | 21.5 | 21.0 | 23.8 | 23.1 |
| PDE5 | 5-209 | 0.2258 | 0.2251 | 0.7742 | 0.7749 | 0.4719 | 0.4472 | 11.3 | 10.9 | 14.7 | 14.2 |
|  | 10-418 | 0.0934 | 0.0984 | 0.9066 | 0.9016 | 0.7469 | 0.7404 | 17.2 | 17.5 | 20.7 | 20.2 |
|  | 15-627 | 0.0558 | 0.0486 | 0.9442 | 0.9514 | 0.8408 | 0.8485 | 19.8 | 20.0 | 22.4 | 22.3 |
|  | 20-836 | 0.0296 | 0.0325 | 0.9704 | 0.9675 | 0.8764 | 0.8690 | 20.5 | 20.1 | 23.3 | 23.2 |
|  | 25-1046 | 0.0214 | 0.0267 | 0.9786 | 0.9733 | 0.9033 | 0.8876 | 21.7 | 21.1 | 23.5 | 23.1 |
| $\alpha_{1A}$AR | 5-209 | 0.1023 | 0.1045 | 0.8977 | 0.8955 | 0.6782 | 0.6637 | 15.7 | 15.2 | 19.6 | 19.5 |
|  | 10-418 | 0.0511 | 0.0571 | 0.9469 | 0.9429 | 0.7415 | 0.7323 | 16.3 | 16.3 | 22.1 | 21.6 |

TABLE 5-continued

Virtual screening results on random splits with the linear kernel.

| Data set | No. train (act-inact) | Ranking error SVM | Ranking error Rank SVM | AUC SVM | AUC Rank SVM | Average precision SVM | Average precision Rank SVM | Actives in top 25 SVM | Actives in top 25 Rank SVM | Actives in top 100 SVM | Actives in top 100 Rank SVM |
|---|---|---|---|---|---|---|---|---|---|---|---|
| | 15-627 | 0.0388 | 0.0386 | 0.9612 | 0.9614 | 0.7890 | 0.7788 | 18.1 | 17.4 | 22.4 | 22.4 |
| | 20-836 | 0.0217 | 0.0173 | 0.9783 | 0.9827 | 0.8277 | 0.8584 | 18.9 | 19.5 | 23.2 | 23.8 |
| | 25-1046 | 0.0130 | 0.0134 | 0.9870 | 0.9866 | 0.8498 | 0.8609 | 19.3 | 19.9 | 23.8 | 23.7 |

TABLE 6

Virtual screening results on random splits with the Tanimoto kernel.

| Data set | No. train (not-inact) | Ranking error SVM | Ranking error Rank SVM | AUC SVM | AUC Rank SVM | Average precision SVM | Average precision Rank SVM | Actives in top 25 SVM | Actives in top 25 Rank SVM | Actives in top 100 SVM | Actives in top 100 Rank SVM |
|---|---|---|---|---|---|---|---|---|---|---|---|
| CDK2 | 5-209 | 0.3088 | 0.2608 | 0.6912 | 0.7392 | 0.3302 | 0.3318 | 7.8 | 7.9 | 11.5 | 11.7 |
| | 10-418 | 0.1880 | 0.1706 | 0.8120 | 0.8294 | 0.5392 | 0.5110 | 13.2 | 12.6 | 16.6 | 16.3 |
| | 15-627 | 0.1504 | 0.1261 | 0.8496 | 0.8739 | 0.6168 | 0.6486 | 14.9 | 16.1 | 17.7 | 18.4 |
| | 20-836 | 0.1070 | 0.0661 | 0.8930 | 0.9339 | 0.7189 | 0.7294 | 17.3 | 17.2 | 20.0 | 21.2 |
| | 25-1046 | 0.0632 | 0.0542 | 0.9368 | 0.9458 | 0.7751 | 0.7507 | 18.5 | 18.0 | 21.6 | 21.9 |
| COX2 | 5-209 | 0.2208 | 0.1961 | 0.7792 | 0.8039 | 0.6188 | 0.6281 | 15.1 | 15.4 | 17.1 | 17.1 |
| | 10-418 | 0.1315 | 0.1165 | 0.8685 | 0.8835 | 0.7079 | 0.7325 | 17.2 | 17.6 | 19.1 | 19.5 |
| | 15-627 | 0.0653 | 0.0654 | 0.9347 | 0.9346 | 0.8032 | 0.8013 | 19.4 | 19.2 | 21.5 | 21.5 |
| | 20-836 | 0.0709 | 0.0345 | 0.9291 | 0.9655 | 0.8251 | 0.8505 | 19.9 | 20.1 | 22.3 | 23.0 |
| | 25-1046 | 0.0306 | 0.0201 | 0.9694 | 0.9799 | 0.8613 | 0.8556 | 20.4 | 20.1 | 23.6 | 23.3 |
| FXa | 5-209 | 0.0751 | 0.0597 | 0.9249 | 0.9403 | 0.7428 | 0.7489 | 19.0 | 19.2 | 20.8 | 21.0 |
| | 10-418 | 0.0589 | 0.0398 | 0.9411 | 0.9602 | 0.8189 | 0.8146 | 20.1 | 20.3 | 22.0 | 22.2 |
| | 15-627 | 0.0280 | 0.0222 | 0.9720 | 0.9778 | 0.8549 | 0.8475 | 20.6 | 20.7 | 23.1 | 23.1 |
| | 20-836 | 0.0164 | 0.0176 | 0.9836 | 0.9824 | 0.8706 | 0.8602 | 20.9 | 20.7 | 23.8 | 23.5 |
| | 25-1046 | 0.0298 | 0.0150 | 0.9702 | 0.9850 | 0.8693 | 0.8693 | 21.1 | 21.0 | 23.7 | 23.8 |
| PDE5 | 5-209 | 0.2362 | 0.2103 | 0.7638 | 0.7897 | 0.4288 | 0.4120 | 10.7 | 10.5 | 13.2 | 13.7 |
| | 10-418 | 0.1093 | 0.0903 | 0.8907 | 0.9097 | 0.7034 | 0.7174 | 16.7 | 16.7 | 20.3 | 20.0 |
| | 15-627 | 0.0462 | 0.0390 | 0.9538 | 0.9610 | 0.8188 | 0.8320 | 19.4 | 19.6 | 22.2 | 22.3 |
| | 20-836 | 0.0323 | 0.0243 | 0.9677 | 0.9757 | 0.8599 | 0.8688 | 20.2 | 20.2 | 23.4 | 23.2 |
| | 25-1046 | 0.0192 | 0.0192 | 0.9808 | 0.9808 | 0.8988 | 0.8976 | 21.4 | 21.1 | 23.5 | 23.7 |
| $\alpha_{1A}$AR | 5-209 | 0.1047 | 0.1052 | 0.8953 | 0.8948 | 0.6420 | 0.6367 | 14.4 | 14.5 | 18.4 | 18.7 |
| | 10-418 | 0.0564 | 0.0565 | 0.9436 | 0.9435 | 0.7106 | 0.7081 | 15.8 | 15.9 | 21.2 | 21.3 |
| | 15-627 | 0.0331 | 0.0340 | 0.9669 | 0.9660 | 0.7702 | 0.7658 | 17.2 | 17.1 | 22.4 | 22.4 |
| | 20-836 | 0.0286 | 0.0168 | 0.9714 | 0.9832 | 0.7902 | 0.8269 | 18.1 | 18.7 | 22.3 | 23.4 |
| | 25-1046 | 0.0195 | 0.0113 | 0.9805 | 0.9887 | 0.8061 | 0.8525 | 18.5 | 19.5 | 23.3 | 23.7 |

QSAR Ranking Experiments in the Chemical Structure Domain:

In QSAR ranking experiments, using exemplary algorithms taught herein two QSAR data sets were used which included inhibitors of dihydrofolate reductase (DHFR) and cyclooxygenase-2 (COX2), respectively, together with corresponding biological activities represented as $pIC_{50}$ values. The DHFR inhibitor data set contained representations of 361 chemical structures, with $pIC_{50}$ values ranging from 3:3 to 9:8. The COX2 inhibitor data set contained representations of 282 chemical structures, with $pIC_{50}$ values ranging from 4:0 to 9:0. Each chemical structure in the above data sets was represented using 2.5D chemical descriptors such as disclosed in Sutherland et al. (2004). The 2.5D chemical descriptors advantageously included 2D descriptors that were calculated simply from the connection graph of a molecule (such as X indices, counts of rotatable bonds, molecular weight and E-state indices), as well as whole-molecule 3D descriptors (such as molecular volume and charged partial surface area descriptors). Details regarding the descriptors can be found in aforementioned Sutherland et al. (2004). The DHFR inhibitor data set contained a total of seventy descriptors; the COX2 inhibitor data set contained seventy-four descriptors. All descriptors were real-valued descriptors; scaled between 0 and 1.

Two different types of train/test splits were considered for the above data sets. The first split involved, for each data set, selecting approximately one-third of the representations of chemical structures using a maximum dissimilarity algorithm for the test set, and using the remaining two-thirds of the representations of chemical structures as the training set. Thus, this split resulted in a training set of 237 representations of chemical structures and test set of 124 representations of chemical structures for the DHFR inhibitor data set, and a training set of 188 representations of chemical structures and test set of ninety-four representations of chemical structures for the COX2 inhibitor data set. Again, the above split represents a worst-case possibility, with the test set being maximally diverse and requiring considerable extrapolation from the training set. A random split was also considered, in which each data set was partitioned randomly into training and test sets of the same sizes as above. In addition, to evaluate the impact of the training set size, experiments were conducted in which each of 10%, 20%, 30%, . . . ,100% of the representations of training chemical structures were used. The above experiments were repeated with ten random partitions of the representations of chemical structures into training and test sets.

As discussed above the performance of an exemplary real-value kernel-based ranking algorithm, as taught herein, was compared with that of a conventional SVR-based ranking method on the above data sets. Thus, for each train/test split of the QSAR data sets described above, the performance of the ranking function learned by each algorithm on the training set was evaluated on the corresponding test set. The following performance measures were considered with respect to the real value ranking problems presented:

1. Ranking error: (approximately) optimized by the exemplary kernel-based ranking algorithm, as taught herein, in the real-valued labels setting described above. Specifically, given a ranking function $f:X \rightarrow \mathbb{R}$ and a test sample $T=((x_1, y_1), \ldots, (x_m, Y_m)) \in (X \times \mathbb{R})^m$, the ranking error of $f$ with respect to T measures the average relevance-weighted ranking loss of $f$ on preference pairs in T:

$$err(f; T) = \frac{1}{|P|} \sum_{(i,j) \in P} (y_i - y_j) \left[ I_{\{f(x_i) < f(x_j)\}} + \frac{1}{2} I_{\{f(x_i) = f(x_j)\}} \right],$$

where $P=\{(i,j) | y_i > y_j\}$ denotes the set of preference pairs in T.

2. Correlation: Two performance measures that have frequently been used in evaluating QSAR models are the root mean squared error (RMSE) and correlation. The RMSE measures the predictive (in)accuracy of a model; the correlation, on the other hand, can be viewed as a measure of ranking performance. Specifically, the (Pearson) correlation between the vector $f=(f(x_1), \ldots, f(x_m))$ of predicted activities (or in the discussed situation scores assigned by the learned function) and the vector $y=(y_1, \ldots, y_m)$ of actual activities is given by:

$$corr(f; T) = \frac{\frac{1}{m-1} \sum_{i=1}^{m} (f(x_i) - \mu_f)(y_i - \mu_y)}{\sigma_f \sigma_y},$$

where $\mu_f, \sigma_f$ are the mean and standard deviation of $f$, respectively, and $\mu_y, \sigma_y$ are similarly the mean and standard deviation of y, respectively. This measures the strength of a linear relationship between the two vectors. In particular, if the relative differences in the scores/activities of chemical structures under the two vectors are roughly proportional to each other (resulting in a similar ranking), the correlation will be high. Note however that if the rankings are similar but the scores have a non-linear relationship, then the correlation may not be an accurate measure of ranking performance. The correlation lies between −1 and 1, with 1 representing a perfect positive linear relationship and −1 representing a perfect negative linear relationship.

3. Kendall's τ rank correlation coefficient: a rank correlation coefficient used to measure the agreement between two rankings; it effectively measures the fraction of pairs of data elements on which two rankings agree. In the present case, Kendall's τ rank correlation was used to measure the expected agreement between the learned ranking of the representations of chemical structures in T and the true ranking based on their biological activities, assuming that ties in the learned ranking are broken uniformly at random:

$$\tau(f; T) = 2 \left( \frac{1}{|P|} \sum_{(i,j) \in P} \left[ I_{\{f(x_i) > f(x_j)\}} + \frac{1}{2} I_{\{f(x_i) = f(x_j)\}} \right] \right) - 1.$$

The Kendall τ coefficient takes a value between −1 and 1, with 1 representing perfect agreement between the rankings and −1 representing perfect disagreement. For more information see Kendall, M., A new measure of rank correlation, Biometrika 1938, 30, 81-89.

4. Spearman's ρ rank correlation coefficient: another rank correlation coefficient used to measure the agreement between two rankings; it measures the standard Pearson correlation between the vectors of ranks of data elements (i.e., their positions in sorted order) resulting from two rankings. Spearman's ρ rank correlation coefficient was used to measure the correlation between the learned ranking of the representations of chemical structures in T and the true ranking based on biological activities. If $\beta_f(i)$ denotes the rank of $x_i$ in the ranking returned by $f$ (such that chemical structures that are assigned the same score by $f$ receive the average rank among them), and $\beta_y(i)$ denotes similarly the rank of $x_i$ in the ranking based on the actual activities, then the Spearman ρ coefficient is given by the Pearson correlation between the vectors and $\beta_f=(\beta_f(1), \ldots, \beta_f(m))$ and $\beta_y=(\beta_y(1), \ldots, \beta_y(m))$:

$$\rho(f; T) = \frac{\frac{1}{m-1} \sum_{i=1}^{m} (\beta_f(i) - \mu'_f)(\beta_y(i) - \mu'_y)}{\sigma'_f \sigma'_y},$$

where $\mu'_f, \sigma'_f$ are mean and standard deviation of $\beta_f$, respectively, and $\mu'_y, \sigma'_y$ are similarly the mean and standard deviation of $\beta_y$, respectively. The Spearman ρ coefficient also takes a value between −1 and 1, with 1 representing perfect agreement and −1 representing perfect disagreement. For more information see Spearman, C., The proof and measurement of association between two things, American Journal of Psychology 1904, 15, 72-101.

5. Normalized discounted cumulative gain (NDCG): a measure of ranking performance in information retrieval, where the relevance of the top few items returned by a ranking is especially important, and is used instead of the average precision when there are more than two possible relevance levels. As with average precision, NDCG places greater emphasis on ranking accuracy at the top of a ranked list: starting from the top, it accumulates a gain value for each data element in the list that is based on the relevance of the data element, but applies a (logarithmic) discounting factor that reduces the gain for data elements lower down in the list. For the present case, NDCG was used to evaluate the ranked list of chemical structures in T returned by $f$. The gain value of each representation of chemical structure in the list was based on the biological activity of the chemical structure. In particular, if $\pi^{-1}(i)$ denotes the index of the chemical structure in T that appears in the ith position in the ranking returned by $f$, then NDCG is given by $$NDCG(f; T) = \frac{1}{Z} \sum_{i=1}^{m} \frac{1}{\log_2(i+1)} \cdot (2^{y_{\pi^{-1}(i)}} - 1),$$

where $1/\log_2(i+1)$ is the discounting factor for the ith-ranking instance, and Z is a normalization constant chosen so that NDCG is at most 1. Higher values of NDCG correspond to better ranking performance.

As discussed previously, the performance of the kernel-based ranking algorithm for ranking with real valued labels was compared with that of SVR-based ranking on two QSAR data sets containing inhibitors of DHFR and COX2, respectively. For both algorithms, experiments were conducted using two types of kernels: the simple linear kernel described above, and the Gaussian or radial basis function (RBF) kernel that may be used with real-valued descriptor vectors:

$$K_{RBF}^{\gamma}(x,x') = e^{-\gamma \|x-x'\|^2},$$

where $\gamma > 0$ is a parameter for the RBF kernel.

For the SVR algorithm, Joachim's SVMlight software was used. The regularization parameter C and the sensitivity parameter $\epsilon$ in each training run were selected by 5-fold cross-validation from the ranges $\{0.1, 1, 10, 100, 1000, 10000\}$ and $\{0.01, 0.05, 0.1, 0.5, 1\}$ respectively. In addition, when using the RBF kernel, the parameter was similarly selected from the range $$\left\{\frac{1}{16}, \frac{1}{4}, 1, 4, 16\right\}.$$

In each case, the combination of parameters that gave the lowest ranking error across the five folds was used in training.

The kernel-based ranking algorithm described with respect to real-valued rankings was not supported in the SVMlight software and was consequently implemented in C++, i.e., rather than use a standard QP solver which can be slow even for moderate-sized ranking problems. Thus, a gradient projection algorithm was implemented to solve the QP involved in training an exemplary real-value kernel-based ranking algorithm (see Equation 10). Since the constraints on the variables $\alpha$ in the QP were simple box constraints, the projection step in this case is simple and efficient. The gradient projection algorithm has two additional parameters, namely the number of iterations t and the learning rate $\eta$. The regularization parameter C, optimization parameters t and $\eta$ (and the kernel parameter $\gamma$ when using the RBF kernel), were all selected in each training run by 5-fold cross-validation as above. The parameters C and $\gamma$ were chosen from the same ranges as above; the parameters t and $\eta$ were selected from the ranges $\{100, 250, 500, 750, 1000\}$ and $\{10^{-6}, 10^{-5}, 10^{-4}, 10^{-3}, 10^{-2}\}$, respectively.

Two different splits of the data sets into training and test sets were considered for the real-valued ranking experiments: an original split where roughly one-third of each data set was chosen to form the test set using a maximum dissimilarity algorithm, and a second split in which each data set was randomly partitioned into training and test sets of the same sizes as in the original split. The results on the original split are shown in Table 7 for the linear kernel, and in Table 8 for the RBF kernel. The performance of the RanksSVM algorithm on these splits is similar overall. Furthermore, both the kernel-based ranking algorithm and the conventional SVM algorithm demonstrated improvement in performance when using the RBF kernel as compared to the linear kernel.

TABLE 7

QSAR ranking results on original splits with the linear kernel.

| Data set | Train/test split | Ranking error | | Correlation | | Kendall's τ | | Spearman's ρ | | NDCG | |
|---|---|---|---|---|---|---|---|---|---|---|---|
| | | SVR | Rank SVM | SVR | Rank SVM | SVR | Rank SVM | SVR | Rank SVM | SVR | Rank SVM |
| DHFR | Original | 0.1914 | 0.1959 | 0.7302 | 0.7190 | 0.5516 | 0.5450 | 0.7495 | 0.7464 | 0.8599 | 0.8377 |
| COX2 | Original | 0.3235 | 0.3217 | 0.5558 | 0.5635 | 0.4195 | 0.4149 | 0.6060 | 0.6060 | 0.8906 | 0.8921 |

TABLE 8

QSAR ranking results on original splits with the RBF kernel.

| Data set | Train/test split | Ranking error | | Correlation | | Kendall's τ | | Spearman's ρ | | NDCG | |
|---|---|---|---|---|---|---|---|---|---|---|---|
| | | SVR | Rank SVM | SVR | Rank SVM | SVR | Rank SVM | SVR | Rank SVM | SVR | Rank SVM |
| DHFR | Original | 0.1837 | 0.1726 | 0.7519 | 0.7618 | 0.5571 | 0.5747 | 0.7552 | 0.7758 | 0.8540 | 0.8632 |
| COX2 | Original | 0.3138 | 0.3173 | 0.5836 | 0.5703 | 0.4351 | 0.4346 | 0.6100 | 0.6174 | 0.9399 | 0.9231 |

Similar to the first split in the bipartite ranking experiments, the original splits for the real-value ranking experiments represented a worst-case scenario, i.e., since the test chemical structures were selected to be maximally diverse and therefore were most likely to require considerable extrapolation from the training set. By comparison, random splits were designed to simulate a situation in which the training set would be more representative of the test set. The results on these random splits, using the linear and RBF kernels, are shown in Tables 9 and 10, respectively. Each number shown in these tables is the average over ten different random splits. In each case, 237 out of 361 representations of chemical structures in the DHFR data set and 188 of 292 representations of chemical structures in the COX2 data set were randomly selected to form the training set; the remaining representations of chemical structures were assigned to the test set (same sizes as in the original splits as above). In addition, in order to evaluate the impact of the training set size, experiments were conducted using increasing fractions of the training set.

TABLE 9

QSAR ranking results on random splits with the linear kernel.

| Data set | No. train | Ranking error SVR | Ranking error Rank SVM | Correlation SVR | Correlation Rank SVM | Kendall's τ SVR | Kendall's τ Rank SVM | Spearman's ρ SVR | Spearman's ρ Rank SVM | NDCG SVR | NDCG Rank SVM |
|---|---|---|---|---|---|---|---|---|---|---|---|
| DHFR | 24 | 0.4967 | 0.4742 | 0.0889 | 0.0519 | 0.0524 | 0.0329 | 0.0763 | 0.0480 | 0.6899 | 0.6855 |
|  | 48 | 0.4014 | 0.4043 | 0.1527 | 0.1626 | 0.1047 | 0.1151 | 0.1562 | 0.1692 | 0.6918 | 0.6938 |
|  | 72 | 0.2900 | 0.4974 | 0.2326 | 0.2044 | 0.1584 | 0.1369 | 0.2312 | 0.2037 | 0.7092 | 0.6974 |
|  | 96 | 0.2531 | 0.4650 | 0.2893 | 0.2204 | 0.2005 | 0.1418 | 0.2935 | 0.2086 | 0.7154 | 0.7127 |
|  | 120 | 0.2074 | 0.2207 | 0.2995 | 0.2718 | 0.2047 | 0.1834 | 0.3003 | 0.2702 | 0.7186 | 0.7032 |
|  | 144 | 0.2005 | 0.1951 | 0.2849 | 0.2925 | 0.1892 | 0.1955 | 0.2808 | 0.2892 | 0.7048 | 0.7062 |
|  | 168 | 0.1973 | 0.1970 | 0.2914 | 0.2968 | 0.1942 | 0.1974 | 0.2864 | 0.2916 | 0.7056 | 0.7080 |
|  | 192 | 0.1974 | 0.2352 | 0.2927 | 0.2823 | 0.2004 | 0.1906 | 0.2955 | 0.2831 | 0.7085 | 0.6997 |
|  | 216 | 0.1921 | 0.1869 | 0.2904 | 0.2834 | 0.1911 | 0.1915 | 0.2828 | 0.2830 | 0.7024 | 0.7020 |
|  | 237 | 0.1961 | 0.3407 | 0.2866 | 0.2806 | 0.1882 | 0.1850 | 0.2767 | 0.2728 | 0.7016 | 0.7078 |
| COX2 | 19 | 0.3979 | 0.3983 | 0.0803 | 0.1095 | 0.0715 | 0.0978 | 0.1032 | 0.1426 | 0.7746 | 0.7719 |
|  | 38 | 0.3717 | 0.3655 | 0.1561 | 0.1559 | 0.1315 | 0.1368 | 0.1918 | 0.1979 | 0.7896 | 0.7893 |
|  | 57 | 0.3365 | 0.3580 | 0.1683 | 0.1690 | 0.1278 | 0.1367 | 0.1925 | 0.1985 | 0.7883 | 0.7901 |
|  | 76 | 0.3023 | 0.2999 | 0.1674 | 0.1728 | 0.1379 | 0.1445 | 0.2008 | 0.2098 | 0.7951 | 0.7925 |
|  | 95 | 0.2639 | 0.4334 | 0.1789 | 0.0822 | 0.1522 | 0.0784 | 0.2188 | 0.1131 | 0.7858 | 0.7801 |
|  | 114 | 0.2581 | 0.2645 | 0.1884 | 0.1872 | 0.1515 | 0.1525 | 0.2204 | 0.2202 | 0.7938 | 0.8006 |
|  | 133 | 0.2669 | 0.2734 | 0.1879 | 0.1794 | 0.1626 | 0.1459 | 0.2316 | 0.2100 | 0.7903 | 0.8037 |
|  | 152 | 0.2535 | 0.2775 | 0.2045 | 0.1945 | 0.1693 | 0.1534 | 0.2434 | 0.2202 | 0.7984 | 0.8161 |
|  | 171 | 0.2439 | 0.3012 | 0.2105 | 0.1712 | 0.1727 | 0.1393 | 0.2465 | 0.1986 | 0.8035 | 0.8152 |
|  | 188 | 0.2429 | 0.2441 | 0.1902 | 0.1934 | 0.1575 | 0.1591 | 0.2243 | 0.2272 | 0.8071 | 0.8065 |

TABLE 10

QSAR ranking results on random splits with the RBF kernel.

| Data set | No. train | Ranking error SVR | Ranking error Rank SVM | Correlation SVR | Correlation Rank SVM | Kendall's τ SVR | Kendall's τ Rank SVM | Spearman's ρ SVR | Spearman's ρ Rank SVM | NDCG SVR | NDCG Rank SVM |
|---|---|---|---|---|---|---|---|---|---|---|---|
| DHFR | 24 | 0.4755 | 0.4655 | 0.0982 | 0.1005 | 0.0727 | 0.0687 | 0.1082 | 0.1012 | 0.7055 | 0.6974 |
|  | 48 | 0.3430 | 0.3512 | 0.1857 | 0.1782 | 0.1225 | 0.1164 | 0.1813 | 0.1739 | 0.7084 | 0.7057 |
|  | 72 | 0.2840 | 0.2701 | 0.2355 | 0.2252 | 0.1552 | 0.1526 | 0.2274 | 0.2231 | 0.7123 | 0.7073 |
|  | 96 | 0.2483 | 0.2363 | 0.2489 | 0.2528 | 0.1715 | 0.1666 | 0.2506 | 0.2442 | 0.7116 | 0.7057 |
|  | 120 | 0.2171 | 0.2123 | 0.2519 | 0.2622 | 0.1692 | 0.1746 | 0.2466 | 0.2550 | 0.7107 | 0.7115 |
|  | 144 | 0.2023 | 0.1968 | 0.2409 | 0.2484 | 0.1667 | 0.1668 | 0.2439 | 0.2425 | 0.7085 | 0.7076 |
|  | 168 | 0.2019 | 0.1821 | 0.2480 | 0.2776 | 0.1657 | 0.1868 | 0.2407 | 0.2721 | 0.7109 | 0.7157 |
|  | 192 | 0.1808 | 0.1742 | 0.2706 | 0.2802 | 0.1830 | 0.1852 | 0.2683 | 0.2708 | 0.7146 | 0.7212 |
|  | 216 | 0.1816 | 0.1727 | 0.2596 | 0.2679 | 0.1772 | 0.1799 | 0.2543 | 0.2651 | 0.7223 | 0.7107 |
|  | 237 | 0.1714 | 0.1702 | 0.2606 | 0.2711 | 0.1754 | 0.1810 | 0.2575 | 0.2660 | 0.7089 | 0.7075 |
| COX2 | 19 | 0.4362 | 0.4294 | 0.1194 | 0.1093 | 0.0937 | 0.0987 | 0.1423 | 0.1494 | 0.7845 | 0.7782 |
|  | 38 | 0.3777 | 0.3717 | 0.1605 | 0.1609 | 0.1257 | 0.1379 | 0.1813 | 0.1985 | 0.7882 | 0.7963 |
|  | 57 | 0.3325 | 0.3249 | 0.1745 | 0.1632 | 0.1478 | 0.1386 | 0.2146 | 0.1950 | 0.7924 | 0.7902 |
|  | 76 | 0.3046 | 0.2953 | 0.1722 | 0.1726 | 0.1444 | 0.1448 | 0.2080 | 0.2085 | 0.7880 | 0.7963 |
|  | 95 | 0.2667 | 0.2635 | 0.1960 | 0.1844 | 0.1615 | 0.1513 | 0.2313 | 0.2171 | 0.7853 | 0.7911 |
|  | 114 | 0.2633 | 0.2620 | 0.1840 | 0.1858 | 0.1455 | 0.1508 | 0.2096 | 0.2145 | 0.7906 | 0.7895 |
|  | 133 | 0.2760 | 0.2705 | 0.1957 | 0.1958 | 0.1560 | 0.1559 | 0.2247 | 0.2241 | 0.7885 | 0.7950 |
|  | 152 | 0.2520 | 0.2579 | 0.2011 | 0.1951 | 0.1626 | 0.1560 | 0.2340 | 0.2233 | 0.7925 | 0.8028 |
|  | 171 | 0.2392 | 0.2403 | 0.1988 | 0.2140 | 0.1650 | 0.1734 | 0.2356 | 0.2460 | 0.8001 | 0.8060 |
|  | 188 | 0.2153 | 0.2255 | 0.1912 | 0.1851 | 0.1553 | 0.1546 | 0.2198 | 0.2184 | 0.7958 | 0.8005 |

The first observation is that as with the original splits above, the use of the RBF kernel leads to an overall improvement in performance over the linear kernel. Notably the improvement in overall performance is more pronounces in the in the case of the kernel-based ranking algorithm when compared to the conventional SVR algorithm. The exemplary kernel-based ranking algorithm, as taught herein, with the linear kernel shows some unstable behavior, where an increase in training set size sometimes leads to deterioration. In contrast, the kernel-based ranking algorithm with RBF kernel, is not only stable, but also exhibits better performance.

A second observation is that in most cases, an increase in training set size leads to improvement in performance on the test set, particularly when measured in terms of the ranking error (except in the anomalous linear kernel instances noted above).

A third observation is that when the complete training set (237 representations of chemical structures for DHFR and 188 representations of chemical structures for COX2) is used, the performance on the COX2 data set is considerably better than in the original split (using any algorithm/kernel) while for the DHFR data set, the performance is roughly the same (except in unstable linear kernel case). Thus, the ranking for the COX2 data set appears to suffer from the use of maximum dissimilarity algorithms in constructing the test set while the ranking for the DHFR data set does not.

Finally, we observe that on these random train/test splits, when the RBF kernel is used, the ranking performance of the kernel-based ranking algorithm in terms of the ranking error (and to some degree, the correlation) is, in general, superior to conventional SVR-based ranking. This improvement may be attributed to the fact that the kernel-based ranking algorithm optimizes the relevance-weighted ranking error which takes into account the actual activity values of the chemical structures.

Discussion Regarding Results of Bipartite and OSAR Ranking Experiments:

In view of the forgoing results for both the virtual screening experiments and the QSAR ranking experiments, it is noted the use of a kernel function more suited to the chemical structure data type (e.g., the Tanimoto kernel for binary fingerprint vectors in virtual screening and the RBF kernel for descriptor vectors in QSAR ranking) showed clear performance gains with ranking techniques when compared to conventional SVM and SVR techniques. Furthermore, since the kernel function in RKHS can be viewed as a similarity function, chemical similarity measures between chemical structures may be applied. See, e.g., Willett, P., Chemical similarity searching, Journal of Chemical Information and Computer Sciences 1998, 38, 983-996 and Nikolova, N.; Jaworska, J., Approaches to measure chemical similarity—a review, QSAR & Combinatorial Science 2003, 22, 1006-1026. While not all such chemical similarity measures satisfy the requirements for a kernel function (namely, the kernel function must be symmetric and positive semi-definite), in cases where the library of representations of chemical structures to be ranked is known in advance, one can construct a chemical similarity graph over the representations of chemical structures in the training set and test library, and then use graph-based ranking methods that effectively construct a kernel function from such a similarity graph. See, e.g., Agarwal, S. (2006). As taught herein, using a kernel function corresponds to constructing an implicit representation of each chemical structure in a new (often high-dimensional) space. Thus, constructing a chemically-inspired kernel function in this manner can be thought of as obtaining an implicit chemical representation of the chemical structures.

The ranking approach as taught herein outperformed classification and regression approaches in terms of the bipartite ranking error or AUC in virtual screening and in terms of the ranking error in QSAR ranking. This can be attributed to the fact that the kernel-based ranking algorithms used in the experiments optimized precisely these criteria. The algorithms, however, may be modified to optimize any desired performance measures, such as average precision and number of actives in the top portion of a list in the bipartite setting, and the rank correlation coefficients and NDCG in the real-valued labels setting.

Evaluation of the Infinite Push Algorithm:

Empirical studies were also conducted evaluating the performance of a ranking algorithm (the Infinite Push algorithm) derived from an error function:

$$R_\infty(f; S) = \max_{1 \le j \le n} \left( \frac{1}{m} \sum_{i=1}^{m} 1_{(f(x_i^+) < f(x_j^-))} \right).$$

Notably the error function for the Infinite Push algorithm is similar and minimized using the same techniques as the error function in equation (1a), above. The error function for the Infinite Push algorithm, similar to the error function in equation (1a), accounts for the fraction of positives ranked below the highest ranked negative. Therefore, minimizing the error function corresponds to maximizing the number of positives that appear before the first negative in the ranked list.

In experiments conducted, the Infinite Push algorithm was analyzed together with a number of other ranking algorithms including RankSVM (see Joachims, T.: Optimizing search engines using clickthrough data. In: Proceedings of the 8th ACM Conference on Knowledge Discovery and Data Mining (2002) and Herbrich, R., Graepel, T., Obermayer, K.: Large margin rank boundaries for ordinal regression, Advances in Large Margin Classifiers (2000) 115-132); SVMMAP (see Yue, Y., Finley, T., Radlinski, F., Joachims, T.: A support vector method for optimizing average precision, In: Proceedings of the 30th ACM SIGIR Conference on Research and Development in Information Retrieval. (2007)), RankBoost (see Freund, Y., Iyer, R., Schapire, R. E., Singer, Y.: An efficient boosting algorithm for combining preferences, Journal of Machine Learning Research 4 (2003) 933-969), and the P-Norm Push algorithm (see C. Rudin. The P-norm push: A simple convex ranking algorithm that concentrates at the top of the list. Journal of Machine Learning Research, 10:2233{2271, 2009).

Performance of these algorithms was evaluated for three different data sets: the Ionosphere dataset (see A. Frank and A. Asuncion. UCI Machine Learning Repository, 2010 http://archive.ics.uci.edu/ml.); the Spambase dataset (Id.); and a cheminformatics data set that has been used to test virtual screening algorithms for drug discovery (see R. N. Jorissen and M. K. Gilson. Virtual screening of molecular databases using a support vector machine. Journal of Chemical Information and Modeling, 45:549{561, 2005).

In each case, four different performance measures were used in the comparison:
1. the area under the ROC curve (AUC);
2. the number of positives retrieved at the absolute top;
3. the average precision (AP); and
4. the discounted cumulative gain (DCG).

Note that the average precision and DCG for a ranking function $f: X \to \mathbb{R}$ and sample $S=(S_+,S_-) \in X^m \times X^n$ are defined as:

$$AP(f; S) = \frac{1}{m} \sum_{i=1}^{m} \frac{1}{r_f(i)} \sum_{k=1}^{m} 1_{(f(x_i^+) < f(x_k^+))},$$

$$DCG(f; S) = \sum_{i=1}^{m} \frac{1}{\log_2(r_f(i) + 1)},$$

wherein $$r_f(i) = 1 + \sum_{k=1}^{m} 1_{(f(x_i^+) < f(x_k^+))} + \sum_{j=1}^{n} 1_{(f(x_i^+) < f(x_j^-))}$$

is the overall rank of $x_i^+$ in the ranking of S returned by $f$.

Note that average precision and DCG also emphasize ranking accuracy at the top. For all four performance measures, a larger value corresponds to better ranking performance.

The first data used was the Ionosphere data set, containing 351 data elements representing radar signals collected from a phased array of antennas; of these, 225 are 'good' (positive), representing signals that react back toward the antennas and indicating structure in the ionosphere, and 126 are 'bad' (negative), representing signals that pass through the ionosphere. Each data element in the data set was described by thirty-three features each scaled to lie in [0; 1]. To train the algorithms, the data set was divided into two-thirds for training and one-third for testing (subject to both having the same proportion of positives); this was repeated 10 times. In each run, the number of iterations $t_{max}$ in the gradient projection algorithms for RankSVM and the Infinite Push was fixed to 1000; the parameters C and _0 were selected from the ranges {0:1; 1; 10; 100; 1000} and {$10^6$; $10^5$; $10^4$; $10^3$; $10^2$}, respectively, using 5-fold cross validation on the training set (in each case, the parameters giving the highest average precision across the 5 folds were selected). The parameter C for SVM-MAP was selected similarly. The number of iterations $t_{max}$ in the P-Norm Push was fixed to 100.

The results are shown in Table 11 (each value is an average over 10 random trials):

TABLE 11

Results on the Ionosphere Data Set

| Training method | AUC | Positives at Top | Average Precision | DCG |
|---|---|---|---|---|
| RankSVM | 0.9271 | 12.1 | 0.9330 | 16.6200 |
| SVMMAP | 0.9207 | 16.5 | 0.9357 | 16.7940 |
| P-Norm Push (p = 1; RankBoost) | 0.9052 | 10.7 | 0.9086 | 16.4462 |
| P-Norm Push (p = 4) | 0.8789 | 6.7 | 0.8849 | 16.2743 |
| P-Norm Push (p = 16) | 0.9070 | 13.9 | 0.9218 | 16.6527 |
| P-Norm Push (p = 64) | 0.8917 | 9.9 | 0.9064 | 16.4970 |
| Infinite Push | 0.9237 | 14.7 | 0.9328 | 16.6336 |

Figure 8:
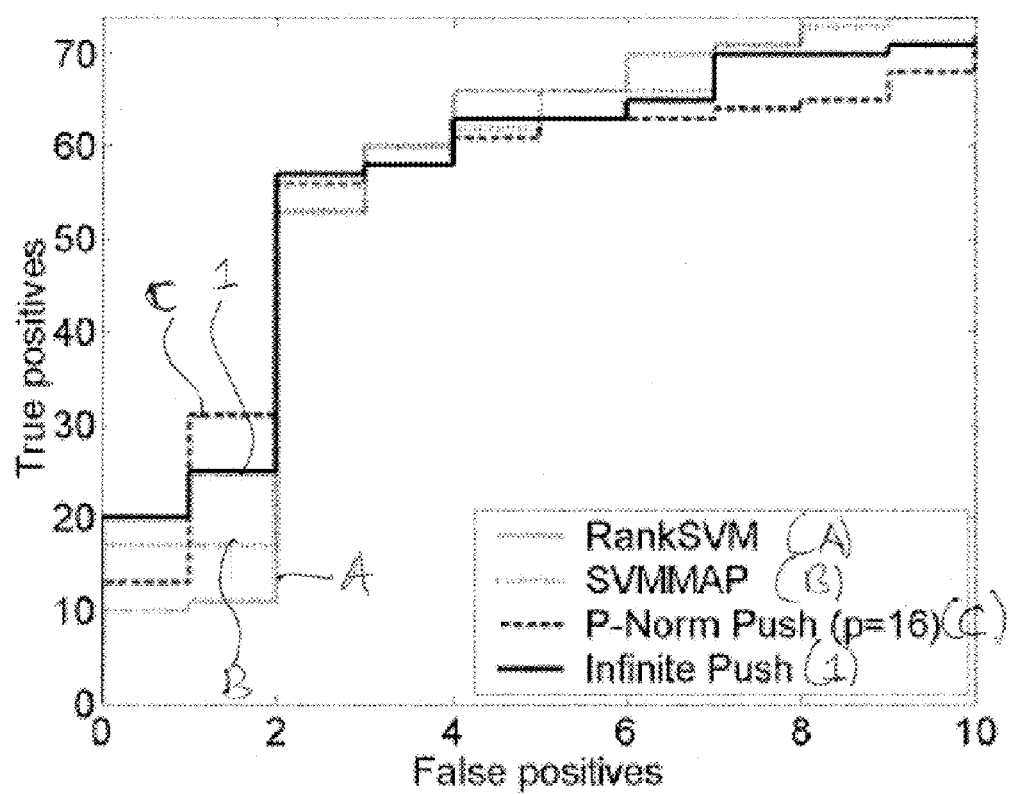
FIG. 8 graphically depicts a comparison of ROC curves for evaluation of an exemplary ranking algorithm for minimizing ranking error at a top portion of the learned ranking using the Ionosphere data set, according to the present disclosure.

For each performance measure, the two algorithms giving the best performance in terms of that measure are highlighted in bold typeface. As expected, the RankSVM algorithm performs well in terms of the AUC. On this data set, the SVM-MAP algorithm gives the highest number of positives at the top, but the Infinite Push algorithm follows closely behind. In particular, the Infinite Push gives more positives at the top than both RankSVM and the P-Norm Push for various values of p. ROC curves for the four algorithms on a sample run (using the best value of p, in terms of number of positives at the top, for the P-Norm Push) are shown in FIG. 8.

The second data set used was the Spambase data set, containing 4601 email messages, of which 1813 are spam. If spam messages are treated as positives, the goal is to learn a ranking that maximizes the number of positives at the top. Each email message is represented as a 57-dimensional feature vector representing various word frequencies and other attributes; each feature was scaled to lie in [0; 1]. In this case only a small randomly divided fraction (5%) of the data set was used for training and the rest for testing. The parameters for the various algorithms were selected same as for the Ionosphere dataset.

The results are shown in Table 12 (again, each value is an average over 10 random trials):

TABLE 12

Results on the Spambase Data Set

| Training method | AUC | Positives at Top | Average Precision | DCG |
|---|---|---|---|---|
| RankSVM | 0.9418 | 22.2 | 0.9010 | 189.6650 |
| SVMMAP | 0.9319 | 48.6 | 0.8957 | 189.6074 |
| P-Norm Push (p = 1; RankBoost) | 0.9194 | 12.5 | 0.8714 | 188.2330 |
| P-Norm Push (p = 4) | 0.8024 | 5.0 | 0.6905 | 180.4931 |
| P-Norm Push (p = 16) | 0.8293 | 24.1 | 0.7707 | 185.4531 |
| P-Norm Push (p = 64) | 0.8490 | 31.4 | 0.8143 | 187.3132 |
| Infinite Push | 0.9388 | 49.9 | 0.9028 | 189.8070 |

As before, for each performance measure, the two algorithms giving the best performance in terms of that measure are highlighted in bold typeface. Again, RankSVM gives the best performance in terms of AUC. In this case, however, the Infinite Push algorithm gives the highest number of positives at the top; it also gives the best performance in terms of the other measures emphasizing accuracy at the top, namely the average precision and DCG. ROC curves for the four algorithms on a sample run (using the best p for the P-Norm Push) are shown in FIG. 9.

The third data used in the Infinite Push Algorithm experiments was a cheminformatics data typically used to test virtual screening algorithms in drug discovery. The data set contained five sets of fifty representations of chemical compounds (each set targeting a different protein) and a background set of 1892 representations of always inactive chemical compounds. Thus, for each of the five targets, there were fifty representations of active compounds, and a total of 2092 representations of inactives (including the 1892 representations of background compounds and the 200 representations of compounds belonging to the other four target sets). Each chemical compound in the above data set was represented using a molecular fingerprint representation (specifically, a 1021-bit vector FP2 fingerprint available with the OpenBabel chemical informatics software package). To train the algorithms, for each target, the fifty representations of actives and 2092 representations of inactives were randomly divided into a small fraction (10%) for training and the rest (90%) for testing (subject to both having the same proportion of actives and inactives); this was repeated ten times. The parameters for the various algorithms were selected as before. In each case, given the training set, the goal was to rank representations of compounds in the test set such that active compounds would be retrieved at the top of the ranked list.

The results are shown in Table 13 (in this case, there were ten random trials for each of the five targets; therefore each value is first averaged over the ten random trials corresponding to each target, and then averaged across the five targets):

TABLE 13

Results on the Cheminformatics Data Set

| Training method | AUC | Positives at Top | Average Precision | DCG |
|---|---|---|---|---|
| RankSVM | 0.8881 | 6.00 | 0.4708 | 6.4877 |
| SVMMAP | 0.8852 | 5.80 | 0.4778 | 6.5580 |
| P-Norm Push (p = 1; RankBoost) | 0.8753 | 3.31 | 0.3714 | 5.9695 |
| P-Norm Push (p = 4) | 0.8525 | 3.16 | 0.3178 | 5.5329 |
| P-Norm Push (p = 16) | 0.8786 | 3.89 | 0.4005 | 6.1465 |
| P-Norm Push (p = 64) | 0.8805 | 3.96 | 0.3997 | 6.1685 |
| Infinite Push | 0.8991 | 6.34 | 0.4910 | 6.6052 |

As before, for each performance measure, the two algorithms giving the best performance in terms of that measure are highlighted in bold typeface. In this case, the Infinite Push algorithm gives the best performance in terms of all four performance measures. The RankSVM performs well in terms of the AUC; SVMMAP performs well in terms of the average precision. ROC curves for the four algorithms on a sample run (using the best p for the P-Norm Push) are shown in FIG. 10.

The above experiments suggest that in the linear case, the Infinite Push algorithm is superior in terms of accuracy at the top when compared to RankSVM and the P-Norm Push for various values of p, and is comparable to SVMMAP (which is an adaptation of structural SVMs to optimizing the average precision). One benefit of the Infinite Push algorithm over SVMMAP, however, is that it can be applied efficiently with nonlinear kernels as well; for SVMMAP, efficient algorithms are known primarily in the linear case.

Evaluation of Exemplary Real-Value Label Algorithms:

Three exemplary real-value label ranking algorithms derived according too the ranking techniques presented herein, were considered. The ranking algorithms learned a linear ranking function $f_w: \mathbb{R}^d \to \mathbb{R}$ by solving an optimization problem of the following form:

$$\min_w \left[ \frac{1}{2}\|w\|^2 + \frac{C}{m}\sum_{i=1}^{m} L(w, S^i) \right]$$

where $L(w; S^i)$ denotes a query-level loss function incurred by a ranking function $f_w$ on the training sample $S^i (S^i = ((\phi_1^i, y_1^i), \ldots, (\phi_{n_i}^i, y_{n_i}^i)))$ associated with the ith query $(\phi_j^i = \phi(q^i, d_j^i))$. The function $L(w; S^i)$ is constructed from relevance-weighted pair-wise hinge loss $l_{H,rel}$ which may be viewed as a convex upper bound on the following relevance-weighted ranking error:

$$l_{rel}(w,(\phi_j^i, y_j^i),(\phi_k^i, y_k^i)) = |y_j^i - y_k^i| \mathbb{1}(z_{jk}^i w \cdot (\phi_j^i - \phi_k^i) < 0)$$

Notably, $l_{rel}$ and therefore $l_{H,rel}$ include a relevancy weighting $|y_j^i - y_k^i|$ such that mis-ranking a pair of instances with relevance labels 1 and 5 incurs a larger penalty than mis-ranking a pair of instances with relevance labels 1 and 2.

The first algorithm considered (RankMM-1) was constructed using average pair-wise loss:

$$L_1^{H,rel}(w, S^i) = \frac{1}{|R_i|} \sum_{(j,k) \in R_i} l_{H,rel}(w, (\phi_j^i, y_j^i), (\phi_k^i, y_k^i)).$$

Thus in addition to the relevance weighting in $l_{H,rel}$ the loss functions differs from the earlier SVM ranking algorithms in that the loss may be normalized by query, taking into account different numbers of data element pairs for different queries.

Stochastic subgradient methods (such as presented in Shalev-Shwartz, S., Singer, Y., Srebro, N.: Pegasos: Primal estimated sub-gradient solver for SVM. In: Proceedings of the 24th International Conference on Machine Learning. (2007)) may be used to directly solve the resulting optimization problem. However, to facilitate development of similar algorithms using other loss formulations a dual version is considered herein. Using standard techniques involving the introduction of slack variables, the minimization problem corresponding to the above loss may be written as:

$$\min_{w,\xi} \left[ \frac{1}{2}\|w\|^2 + \frac{C}{m}\sum_{i=1}^{m} \frac{1}{|R_i|} \sum_{(j,k)\in R_i} \xi_{jk}^i \right]$$

subject to:

$$\xi_{jk}^i \geq 0 \quad \forall i, j, k$$
$$\xi_{jk}^i \geq (y_j^i - y_k^i) - w \cdot (\phi_j^i - \phi_k^i) \quad \forall i, j, k.$$

Introducing Lagrange multipliers and taking the Lagrangian dual then results in the following convex QP:

$$\min_\alpha \left[ \frac{1}{2}\sum_{i=1}^{m} \sum_{(j,k)\in R_i} \sum_{i'=1}^{m} \sum_{(j',k')\in R_{i'}} \alpha_{jk}^i \alpha_{j'k'}^{i'} Q_{jk,j'k'}^{i,i'} - \right.$$

$$\left. \sum_{i=1}^{m} \sum_{(j,k)\in R_i} \alpha_{jk}^i (y_j^i - y_k^i) \right]$$

subject to:

$$0 \leq \alpha_{jk}^i \leq \frac{C}{m|R_i|} \quad \forall i, j, k,$$

wherein $Q_{jk,j'k'}^{i,i'} = (\phi_j^i - \phi_k^i) \cdot (\phi_{j'}^{i'} - \phi_{k'}^{i'})$.

A simple stochastic gradient projection method may be used to solve the QP which starts with some initial values $\alpha^{(1)}$ for $\alpha$ and on each iteration t, randomly selects a single query i and updates the corresponding $|R_i|$ variables $\alpha_{jk}^{i(t)}$ using a gradient projection step:

$$\alpha^{i(t+1)} \leftarrow \mathcal{P}_{\Omega_i}(\alpha^{i(t)} - \eta_t \nabla^{i(t)}),$$

$$\alpha^{i'(t+1)} \leftarrow \alpha^{i'(t)}$$

for $i' \neq i$, wherein $\eta_0 > 0$ is a learning rate; $\nabla^{i(t)} \in \mathbb{R}^{|R_i|}$ is the partial gradient of the objective function in the above QP with respect to $\alpha^i$, evaluated at $\alpha^{(t)}$;

$$\Omega_i = \left\{ \alpha^i \in \mathbb{R}^{|R_i|} : 0 \leq \alpha_{jk}^i \leq \frac{C}{m|R_i|} \forall (j,k) \in R_i \right\}$$

is the constraint set for $\alpha^i$ in the above QP; and $\mathcal{P}_{\Omega_i}$ denotes the Euclidean projection onto $\Omega_i$.

The second algorithm considered (RankMM-2) was constructed using a maximum pair-wise loss:

$$L_2^{H,rel}(w, S^i) = \max_{(j,k)\in R_i} [l_{H,rel}(w, (\phi_j^i, y_j^i), (\phi_k^i, y_k^i))]$$

wherein ranking margin w is defined as $(j,k) \in R_i$ as $w \cdot (\phi_j^i - \phi_k^i)$ if $w \cdot (\phi_j^i - \phi_k^i) < (y_j^i - y_k^i)$, and $(y_j^i - y_k^i)$ otherwise. Thus, the resulting algorithm maximizes the minimum ranking margin across all instance pairs associated with each query.

Introducing slack variables, the corresponding loss minimization problem may be written as:

$$\min_{w,\xi} \left[ \frac{1}{2}\|w\|^2 + \frac{C}{m}\sum_{i=1}^{m} \xi^i \right]$$

subject to:

$$\xi^i \geq 0 \quad \forall i$$
$$\xi^i \geq (y_j^i - y_k^i) - w \cdot (\phi_j^i - \phi_k^i) \quad \forall i, j, k.$$

Introducing Lagrange multipliers and taking the Lagrangian dual then results in the following convex QP (after an appropriate scaling of variables, and introduction of an additional variable $\alpha_0^i$ for each i:

$$\min_\alpha \left[ \frac{1}{2}\sum_{i=1}^{m} \sum_{(j,k)\in R_i} \sum_{i'=1}^{m} \sum_{(j',k')\in R_{i'}} \alpha_{jk}^i \alpha_{j'k'}^{i'} \frac{C}{m} Q_{jk,j'k'}^{i,i'} - \right.$$

-continued $$\sum_{i=1}^{m} \sum_{(j,k) \in R_i} \alpha_{jk}^i (y_j^i - y_k^i) \Bigg]$$

subject to:

$$\alpha_0^i + \sum_{(j,k) \in R_i} \alpha_{jk}^i = 1 \quad \forall \, i$$

$$\alpha_{jk}^i, \alpha_0^i \geq 0 \quad \forall \, i, j, k.$$

The constraints in the above problem force $\alpha^i$ to lie in the simplex $\Delta_i$ of distributions over $|R_i|+1$ elements for each i. This allows for derivation of an efficient exponentiated gradient (EG) algorithm which, in this case, starts with an initial set of distributions $\alpha^{(1)} \in \Delta_1 \times \ldots \times \Delta_m$, and on each iteration t, updates the distribution associated with a single randomly chosen query i using an exponentiated gradient step:

$$\alpha_{jk}^{i\,(t+1)} \leftarrow \frac{\alpha_{jk}^{i\,(t)} \exp(-\eta_0 \nabla_{jk}^{i\,(t)})}{Z^{(t)}}; \; \alpha_0^{i\,(t+1)} \leftarrow \frac{\alpha_0^{i\,(t)}}{Z^{(t)}},$$

$$\alpha^{i'\,(t+1)} \leftarrow \alpha^{i'\,(t)} \text{ for } i' \neq i,$$

wherein $\eta_0 > 0$ is a constant learning rate; $\nabla_{jk}^{i\,(t)}$ is the partial derivative of the objective in the above QP with respect to $\alpha_{jk}^i$, evaluated at $\alpha^{(t)}$; and $Z^{(t)}$ chosen to ensure $\alpha^{i\,(t+1)} \in \Delta_i$.

The third algorithm considered (RankMM-3) was constructed using a hybrid of average and maximum pair-wise loss:

$$L_3^{H,rel}(w, S^i) = \max_{k: |P_{ik}| > 0} \frac{1}{|P_{ik}|} \sum_{j \in P_{ik}} l_{H,rel}(w, (\phi_j^i, y_j^i), (\phi_k^i, y_k^i)),$$

This distinguishes ranking errors at the top of the list from ranking errors at the bottom of the list since, in practice ranking errors at the top of the list may often be more costly. Thus, $P_{ik} = \{j | y_j^i > y_k^i\}$ denotes the set of instances that are preferred to $d_k^i$.

To see why this loss term might penalize ranking errors at the top more heavily than ranking errors at the bottom, note that the cost of each 'mis-ranking up' of a data element is inversely weighted by the number of data elements preferred to it; therefore, 'mis-ranking up' a lower-relevance data element by a few positions is less costly than 'mis-ranking up' a higher-relevance data element. By minimizing the largest such 'mis-ranking up' cost over all data elements, the resulting algorithm should therefore discourage mis-ranking of higher-relevance data elements, resulting in good accuracy at the top of the returned ranking.

Introducing slack variables, the corresponding loss minimization problem may be written as:

$$\min_{w, \xi} \left[ \frac{1}{2} \|w\|^2 + \frac{C}{m} \sum_{i=1}^{m} \xi^i \right]$$

subject to:

$$\xi^i \geq \frac{1}{|P_{ik}|} \sum_{j \in P_{ik}} \xi_{jk}^i \quad \forall \, i, k$$

$$\xi_{jk}^i \geq 0 \quad \forall \, i, j, k$$

$$\xi_{jk}^i \geq (y_j^i - y_k^i) - w \cdot (\phi_j^i - \phi_k^i) \quad \forall \, i, j, k.$$

Introducing Lagrange multipliers and taking the Lagrangian dual then results in the following convex optimization problem (after an appropriate scaling of variables):

$$\min_{\alpha, \gamma} \left[ \frac{1}{2} \sum_{i=1}^{m} \sum_{(j,k) \in R_i} \sum_{i'=1}^{m} \sum_{(j',k') \in R_{i'}} \alpha_{jk}^i \alpha_{j'k'}^{i'} \frac{Q_{jk,j'k'}^{i,i'}}{|P_{ik}||P_{i'k'}|} - \sum_{i=1}^{m} \sum_{(j,k) \in R_i} \alpha_{jk}^i \frac{(y_j^i - y_k^i)}{|P_{ik}|} \right]$$

wherein $$0 \leq \alpha_{jk}^i \leq \gamma_k^i \quad \forall \, i, j, k$$

$$\sum_{k: |P_{ik}| > 0} \gamma_k^i = \frac{C}{m} \quad \forall \, i.$$

The constraints in this case can be interpreted as a set of constraints on the $l_{1,\infty}$-norm of the $\alpha^i$ for each i, together with non-negativity constraints. Algorithms for calculating the $l_{1,\infty}$-norm projection are presented in Quattoni, A., Carreras, X., Collins, M., Darrell, T.: An efficient projection for 11; 1 regularization; In: Proceedings of the 26th International Conference on Machine Learning. (2009). By obtaining the $l_{1,\infty}$-norm projection a stochastic gradient projection method similar to above may be applied.

The RankMM-1, RankMM-2 and RankMM-3 algorithms were evaluated for an OHSUMED data set, using a benchmark data set for IR ranking algorithms available publicly as part of the LETOR distribution (LETOR 3.0). The data set consisted of 106 medical queries. Each query was associated with a number of documents, each of which was judged by human experts as being either definitely relevant to the query (label 2), partially relevant (label 1), or not relevant (label 0). There were a total of 16,140 such query-document pairs with relevance judgments (an average of roughly 152 judged documents per query). Each query-document pair was represented as a vector of 45 features.

There were five folds provided in the data set; each fold consists of a split of the queries into roughly 60% for training, 20% for validation, and 20% for testing. The algorithms were evaluated on these five folds and their performance compared to several other ranking algorithms: regression, RankSVM (see Joachims, T.: Optimizing search engines using clickthrough data. In: Proceedings of the 8th ACM Conference on Knowledge Discovery and Data Mining (2002) and Herbrich, R., Graepel, T., Obermayer, K.: Large margin rank boundaries for ordinal regression, Advances in Large Margin Classifiers (2000) 115-132), RankBoost (see Freund, Y., Iyer, R., Schapire, R. E., Singer, Y.: An efficient boosting algorithm for combining preferences, Journal of Machine Learning Research 4 (2003) 933-969), ListNet (See Cao, Z., Qin, T., Liu, T. Y., Tsai, M. F., Li, H.: Learning to rank: From pairwise approach to listwise approach. In: Proceedings of the 24th International Conference on Machine Learning (2007)), two versions of AdaRank (Xu, J., Li, H.: AdaRank: A boosting algorithm for information retrieval, In: Proceedings of the 30th ACM SIGIR Conference on Research and Development in Information Retrieval, (2007)), and SVMMAP (see Yue, Y., Finley, T., Radlinski, F., Joachims, T.: A support vector method for optimizing average precision, In: Proceedings of the 30th ACM SIGIR Conference on Research and Development in Information Retrieval. (2007)).

The following performance measures were used to evaluate the algorithms:

1. NDCG@k: The NDCG@k is simply NDCG truncated to the top k documents returned by ranking function $f$. See Jrarvelin, K., Kekalainen, J.: Cumulated gain-based evaluation of IR techniques. ACM Transactions on Information Systems 20(4) (2002) 422-446.

2. Prec@k: Prec@k is the proportion of relevant documents in the top k documents returned by the ranking function $f$.

3. Average Precision (AP or MAP): MAP is the average Prec@k over all positions k occupied by relevant documents.

Figure 11:
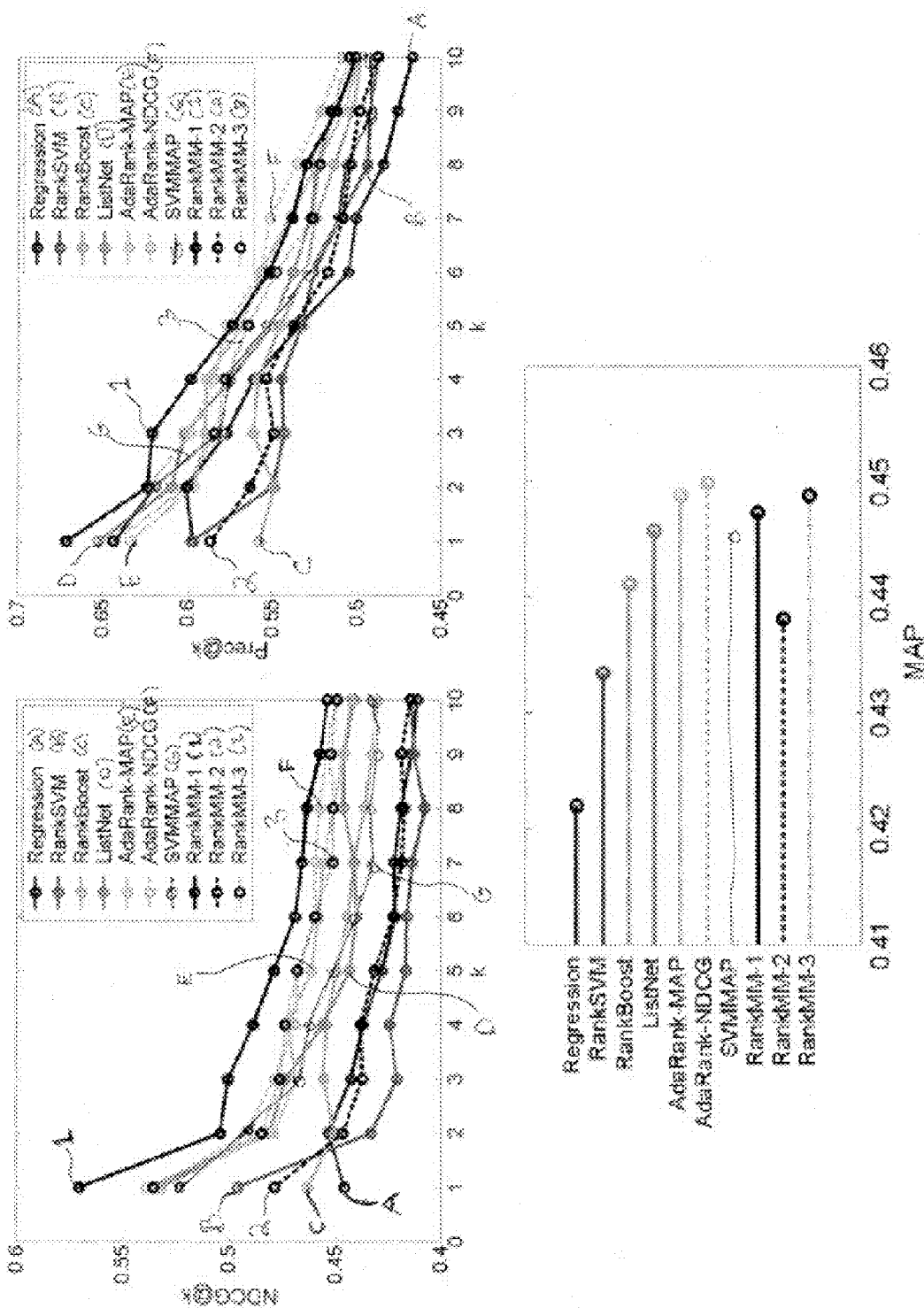
FIG. 11 graphically depicts an evaluation of three exemplary real-value label algorithms, according to the present disclosure.

The results are shown in FIG. 11. Of the algorithms shown for comparison, regression is a point-wise algorithm that predicts labels of individual documents; RankSVM and RankBoost are pair-wise ranking algorithms; and the remainder are list-wise ranking algorithms, with the last three directly optimizing the MAP or NDCG. Other than RankBoost, which uses thresholded features as weak rankers, all algorithms learn a linear ranking function. The performance of the algorithms, particularly RankMM-1 and RankMM-3, were considerably superior to the standard pair-wise (and point-wise) ranking algorithms2, and in many cases, is comparable to the performance of the algorithms that directly optimize the MAP or NDCG. The RankMM-2 appears not to have been as suited to IR performance measures; RankMM-3 appears to have been particularly suited to MAP. The best overall performance (for this data set) was obtained using RankMM-1.

Machine Embodiments:

It is contemplated that the methods, systems and non-transitory media presented herein may be carried out, e.g., via one or more programmable processing units having associated therewith executable instructions held on one or more non-transitory computer readable medium, RAM, ROM, harddrive, and/or hardware for solving for, deriving and/or applying ranking functions according to the algorithms taught herein. In exemplary embodiments, the hardware, firmware and/or executable code may be provided, e.g., as upgrade module(s) for use in conjunction with existing infrastructure (e.g., existing devices/processing units). Hardware may, e.g., include components and/or logic circuitry for executing the embodiments taught herein as a computing process.

Displays and/or other feedback means may also be included to convey detected/processed data. Thus, in exemplary embodiments, ranking results may be displayed, e.g., on a monitor. The display and/or other feedback means may be stand-alone or may be included as one or more components/modules of the processing unit(s). In exemplary embodiments, the display and/or other feedback means may be used to facilitate selection of one or more chemical structures or portions of chemical structures for as drug candidates.

The software code or control hardware which may be used to implement some of the present embodiments is not intended to limit the scope of such embodiments. For example, certain aspects of the embodiments described herein may be implemented in code using any suitable programming language type such as, for example, C or C++ using, for example, conventional or object-oriented programming techniques. Such code is stored or held on any type of suitable non-transitory computer-readable medium or media such as, for example, a magnetic or optical storage medium.

As used herein, a "processor," "processing unit," "computer" or "computer system" may be, for example, a wireless or wireline variety of a microcomputer, minicomputer, server, mainframe, laptop, personal data assistant (PDA), wireless e-mail device (e.g., "BlackBerry" trade-designated devices), cellular phone, pager, processor, fax machine, scanner, or any other programmable device configured to transmit and receive data over a network. Computer systems disclosed herein may include memory for storing certain software applications used in obtaining, processing and communicating data. It can be appreciated that such memory may be internal or external to the disclosed embodiments. The memory may also include non-transitory storage medium for storing software, including a hard disk, an optical disk, floppy disk, ROM (read only memory), RAM (random access memory), PROM (programmable ROM), EEPROM (electrically erasable PROM), etc.

Figure 12:
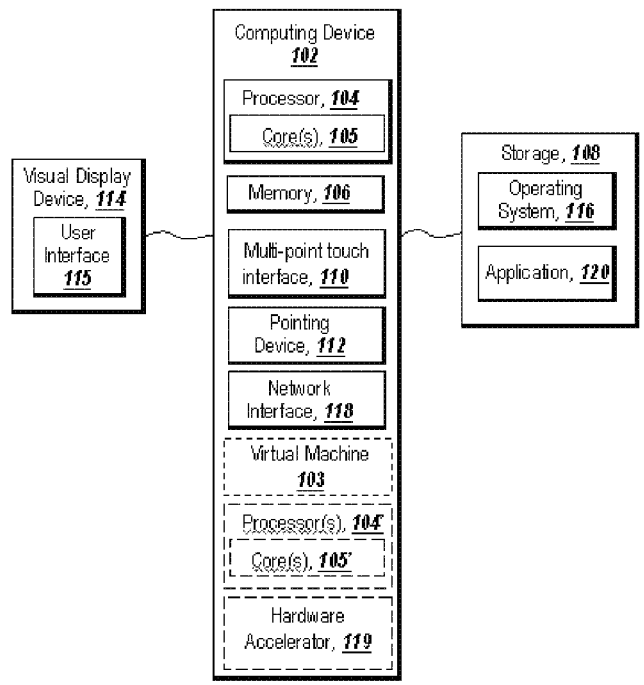
FIG. 12 depicts a block flow diagram of an exemplary computing environment suitable for determining functions for ranking data elements as taught herein and for ranking data elements as taught herein.

Referring now to FIG. 12, an exemplary computing environment suitable for practicing exemplary embodiments is depicted. The environment may include a computing device 102 which includes one or more non-transitory media for storing one or more computer-executable instructions or code for implementing exemplary embodiments. For example, memory 106 included in the computing device 102 may store computer-executable instructions or software, e.g. instructions for implementing and processing an application 120 for solving for, deriving, and/or applying a ranking algorithm for ranking data elements, as taught herein. For example, execution of application 120 by processor 104 may programmatically (i) determine a ranking error as a function of ranking order discrepancies between a first predetermined ranking of a plurality of data elements and a second ranking of the plurality of data elements by a ranking function, and (i) solve the ranking error function for the ranking function, whereby the ranking error is minimized with respect to the first ranking of the plurality of data elements. In some embodiments, execution of application 120 by processor 104 may apply a ranking function minimizing ranking error between a first predetermined ranking of a training plurality of data elements and a second ranking of the training plurality of data elements by the ranking function, as taught herein, to rank a test set of data elements, for example in response to a query.

The computing device 102 also includes processor 104, and, one or more processor(s) 104' for executing software stored in the memory 106, and other programs for controlling system hardware. Processor 104 and processor(s) 104' each can be a single core processor or multiple core (105 and 105') processor. Virtualization can be employed in computing device 102 so that infrastructure and resources in the computing device can be shared dynamically. Virtualized processors may also be used with application 120 and other software in storage 108. A virtual machine 103 can be provided to handle a process running on multiple processors so that the process appears to be using only one computing resource rather than multiple. Multiple virtual machines can also be used with one processor. Other computing resources, such as field-programmable gate arrays (FPGA), application specific integrated circuit (ASIC), digital signal processor (DSP), Graphics Processing Unit (GPU), and general-purpose processor (GPP), may also be used for executing code and/or software. A hardware accelerator 119, such as implemented in an ASIC, FPGA, or the like, can additionally be used to speed up the general processing rate of the computing device 102.

The memory 106 may comprise a computer system memory or random access memory, such as DRAM, SRAM, EDO RAM, etc. The memory 106 may comprise other types of memory as well, or combinations thereof. A user may interact with the computing device 102 through a visual display device 114, such as a computer monitor, which may display one or more user interfaces 115. The visual display device 114 may also display other aspects or elements of exemplary embodiments, e.g., databases, ranking results, etc. The computing device 102 may include other I/O devices such a keyboard or a multi-point touch interface 110 and a pointing device 112, for example a mouse, for receiving input from a user. The keyboard 110 and the pointing device 112 may be connected to the visual display device 114. The computing device 102 may include other suitable conventional I/O peripherals. The computing device 102 may further comprise a storage device 108, such as a hard-drive, CD-ROM, or other storage medium for storing an operating system 116 and other programs, e.g., application 120 characterized by computer executable instructions solving for, deriving, and/or applying a ranking algorithm for ranking data elements, as taught herein.

The computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 118 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

The computing device 102 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Figure 13:
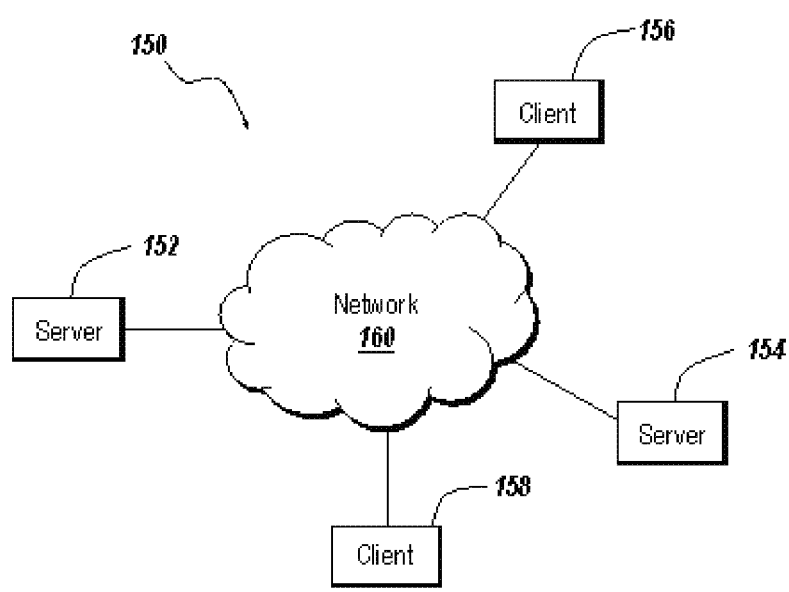
FIG. 13 depicts an exemplary network environment suitable for a distributed implementation of the embodiments taught herein.

FIG. 13 illustrates an exemplary network environment 150 suitable for a distributed implementation of exemplary embodiments. The network environment 150 may include one or more servers 152 and 154 coupled to clients 156 and 158 via a communication network 160. In one implementation, the servers 152 and 154 and/or the clients 156 and/or 158 may be implemented via the computing device 102. The network interface 118 of the computing device 102 enables the servers 152 and 154 to communicate with the clients 156 and 158 through the communication network 160. The communication network 160 may include Internet, intranet, LAN (Local Area Network), WAN (Wide Area Network), MAN (Metropolitan Area Network), wireless network (e.g., using IEEE 802.11 or Bluetooth), etc. In addition the network may use middleware, such as CORBA (Common Object Request Broker Architecture) or DCOM (Distributed Component Object Model) to allow a computing device on the network 160 to communicate directly with another computing device that is connected to the network 160.

In the network environment 160, the servers 152 and 154 may provide the clients 156 and 158 with software components or products under a particular condition, such as a license agreement. The software components or products may include one or more components of the application 120. For example, the client 156 may solve for and/or derive a ranking function which is subsequently applied over the server 152 for ranking representations of chemical structures.

Although the teachings herein have been described with reference to exemplary embodiments and implementations thereof, the disclosed methods, systems and media are not limited to such exemplary embodiments/implementations. Rather, as will be readily apparent to persons skilled in the art from the description taught herein, the disclosed methods, systems and media are susceptible to modifications, alterations and enhancements without departing from the spirit or scope hereof. Accordingly, all such modifications, alterations and enhancements within the scope hereof are encompassed herein.

What is claimed is:

1. A computer implemented method for learning a ranking function for ranking a plurality of representations of chemical structures, the method comprising
    determining, with a computing process on a computing device, ranking error as a function of ranking order discrepancies between a predetermined first ranking of a plurality of representations of chemical structures and a second ranking of the plurality of representations of chemical structures by the ranking function, and
    solving, with the computing process on the computing device, the ranking error function for the ranking function, whereby the ranking error is minimized with respect to the second ranking of the plurality of representations of chemical structures.

2. The computer implemented method of claim 1, wherein the ranking error function is sensitive to incorrectly ranked pairs of chemical structures as ranked by the ranking function.

3. The computer implemented method of claim 1, wherein the ranking function is a function of one or more chemical descriptors for chemical structures.

4. The computer implemented method of claim 1, wherein determining a ranking error includes one of (i) selecting the ranking error function, (ii) deriving the ranking error function.

5. The computer implemented method of claim 1, wherein the plurality of representations of chemical structures comprises a training set of representations of chemical structures for use in machine learning.

6. The computer implemented method of claim 1, wherein each of the plurality of representations of chemical structures is characterized by one or more chemical descriptors.

7. The computer implemented method of claim 1, wherein each of the plurality of representations of chemical structures is characterized by a label related to the known ranking thereof.

8. The computer implemented method of claim 7, wherein the labels are bipartite labels.

9. The computer implemented method of claim 8, wherein the bipartite labels correlate whether each of the chemical structures is active or inactive with respect to a chemical activity.

10. The computer implemented method of claim 7, wherein the labels are real-value labels.

11. The computer implemented method of claim 10, wherein the real-value labels correlate to at least one of (i) relevance of each chemical structure with respect to an application, and (ii) activity level of each chemical structure with respect to a chemical activity.

12. The computer implemented method of claim 10, wherein the ranking error function weights an incorrectly ranked pair of representations of chemical structures by the difference in label values for the pair.

13. The computer implemented method of claim 1, wherein the ranking error function accounts for preferences as between two or more representations of chemical structures.

14. The computer implemented method of claim 13, wherein the preferences supplement the predetermined first ranking so as to better distinguish between pairs of representations having similar rankings.

15. The computer implemented method of claim 1, wherein preferences are used to indicate the predetermined ranking.

16. The computer implemented method of claim 1, wherein the ranking error function includes terms encouraging accuracy in a top portion of the ranking.

17. The computer implemented method of claim 16, wherein the ranking error function accounts for a fraction of positives ranked below a highest ranking negative such that minimization of the ranking error function results in a ranking function that maximizes a number of positives that appear before a first negative.

18. The computer implemented method of claim 1, wherein the ranking error function includes a terms encouraging diversity among the representations of chemical structures in a top portion of the ranking.

19. The computer implemented method of claim 18, wherein the ranking error function optimizes a trade-off between ranking accuracy and diversity.

20. The computer implemented method of claim 1, wherein the ranking function is a kernel-based ranking function derived from a reproducing kernel Hilbert space (RKHS).

21. The computer implemented method of claim 20, wherein the kernel is selected to best suit the data type being investigated.

22. The computer implemented method of claim 21, wherein the kernel is a Tanimoto kernel.

23. The computer implemented method of claim 21, wherein the kernel is a RBF kernel.

24. The computer implemented method of claim 1, wherein solving for the ranking function includes solving a derivative optimization problem resulting from the Lagrangian dual of an optimization problem presented by the minimization of the ranking error function.

25. The computer implemented method of claim 24, wherein the derivative optimization problem is a quadratic program (QP).

26. The computer implemented method of claim 1, wherein solving for the ranking function includes applying a gradient projection algorithm so as to reduce processing time.

27. The computer implemented method of claim 1, wherein the ranking function is derived using chemical similarity functions designed specifically to measure similarities between the representations of the chemical structures.

28. The computer implemented method of claim 1, wherein solving the ranking error function for the ranking function includes minimizing a regularized version of a convex upper bound of the ranking error function if a discrete nature of the ranking error function prevents direct minimization thereof.

29. A computer implemented method for ranking a plurality of representations of chemical structures the method comprising
providing a ranking function minimizing ranking error as a function of ranking order discrepancies between a predetermined first ranking of a training plurality of representations of chemical structures and a second ranking of the training plurality of representations of chemical structures by the ranking function,
applying the ranking function to rank a test plurality of representations of chemical structures, and
identifying from the ranking of the test plurality of representations of chemical structures at least one representation of a chemical structure having a characteristic consistent with the training plurality of representations of chemical structures.

30. The computer implemented method of claim 29, wherein the steps of applying and identifying are carried out by a computing device.

31. The computer implemented method of claim 29, wherein the representations of chemical structures represent at least one of: a chemical structure and a portion of a chemical structure.

32. A computing system comprising:
a computing device programmed to execute a computing process defined by computer readable instruction for determining a ranking error as a function of ranking order discrepancies between a first predetermined ranking of a plurality of representations of chemical structures and a second ranking of the plurality of representations of chemical structures by a ranking function, and solving the ranking error function for the ranking function, whereby the ranking error is minimized with respect to the first ranking of the plurality of representations of chemical structures and
a storage means storing the computing process.

33. A computing system comprising:
a computing device programmed to carry out a computing process including, applying a ranking function derived from minimizing ranking error as a function of ranking order discrepancies between a predetermined first ranking of a training plurality of representations of chemical structures and a second ranking of the training plurality of representations of chemical structures by the ranking function to rank a test plurality of representations of chemical structures; and
a feedback means for providing feedback with respect to the ranked test plurality of representations of chemical structures.

34. A non-transitory computer-readable storage medium storing computer executable instructions for:
determining a ranking error as a function of ranking order discrepancies between a first predetermined ranking of a plurality of representations of chemical structures and a second ranking of the plurality of representations of chemical structures by a ranking function, and
solving the ranking error function for the ranking function, whereby the ranking error is minimized with respect to the first ranking of the plurality of representations of chemical structures.

35. A non-transitory computer readable medium storing computer executable instructions for:
applying a ranking function derived from minimizing ranking error as a function of ranking order discrepancies between a predetermined first ranking of a training plurality of representations of chemical structures and a second ranking of the training plurality of representations of chemical structures by the ranking function to rank a test plurality of representations of chemical structures; and providing feedback with respect to the ranked test plurality of representations of chemical structures.

36. A computer implemented method for ranking a plurality of representations of chemical structures the method comprising:

receiving a query characterizing a ranking problem for a plurality of representations of chemical structures, processing the query to learn a ranking function wherein the learning the ranking function includes:

determining, with a computing process on a computing device, ranking error as a function of ranking order discrepancies between a predetermined first ranking of a training plurality of the representations of chemical structures and a second ranking of the training plurality of the representations of chemical structures by the ranking function, and solving, with the computing process on the computing device, the ranking error function for the ranking function, whereby the ranking error is minimized with respect to the second ranking of the training plurality of the representations of chemical structures, applying the ranking function to rank a to a test plurality of the representations of chemical structures, and returning a result to the query based on the ranking of the test plurality of the representations of chemical structures.

37. A computing system comprising:

input means for inputting a query characterizing a ranking problem for a plurality of representations of chemical structures, a processor for processing the query to learn and apply a ranking function by executing a computing process, storage means storing computer executable instructions for the computing process the computer executable instructions including:

determining a ranking error as a function of ranking order discrepancies between a first predetermined ranking of a training plurality of the representations of chemical structures and a second ranking of the training plurality of the representations of chemical structures by a ranking function, solving the ranking error function for the ranking function, whereby the ranking error is minimized with respect to the first ranking of the training plurality of the representations of chemical structures, and applying the ranking function to rank a to a test plurality of the representations of chemical structures, and output means for returning a result to the query based on the ranking of the test plurality of the representations of chemical structures.

38. A computer implemented method for ranking a plurality of representations of chemical structures the method comprising:

providing a known ranking for a plurality of representations of chemical structures in a training set, deriving a ranking function that minimizes ranking error for the ranking function with respect to the known ranking of the plurality of representations of chemical structures in the training set, and ranking a plurality of representations of chemical structures in a test set using the derived ranking function.

39. A computer implemented method for learning a ranking function for ranking a plurality of data elements, the method comprising determining, with a computing process on a computing device, ranking error as a function of ranking order discrepancies between a predetermined first ranking of a plurality of data elements and a second ranking of the plurality of data elements by the ranking function, wherein the ranking error function includes terms encouraging accuracy in a top portion of the ranking, and solving, with the computing process on the computing device, the ranking error function for the ranking function, whereby the ranking error is minimized with respect to the second ranking of the plurality of data elements.

40. The computer implemented method of claim 39, wherein the ranking error function accounts for a fraction of positives ranked below a highest ranking negative such that minimization of the ranking error function results in a ranking function that maximizes a number of positives that appear before a first negative.

41. The computer implemented method of claim 39, wherein the plurality of data elements are any of (i) documents, (ii) websites, (iii) email, and (iv) radar signals.

42. The computer implemented method of claim 39, wherein the plurality of data elements are data representations of chemical structures.

43. A computing system comprising:

a computing device programmed to execute a computing process defined by computer readable instruction for determining a ranking error as a function of ranking order discrepancies between a first predetermined ranking of a plurality of data elements and a second ranking of the plurality of data elements by a ranking function, and solving the ranking error function for the ranking function, whereby the ranking error is minimized with respect to the first ranking of the plurality of data elements, wherein the ranking error function includes terms encouraging accuracy in a top portion of the ranking, and a storage means storing the computing process.

44. The system of claim 43, wherein the ranking error function accounts for a fraction of positives ranked below a highest ranking negative such that minimization of the ranking error function results in a ranking function that maximizes a number of positives that appear before a first negative.

* * * * *